US012547365B2

(12) United States Patent
Seo et al.

(10) Patent No.: US 12,547,365 B2
(45) Date of Patent: Feb. 10, 2026

(54) ELECTRONIC DEVICE FOR USING EXTERNAL DEVICE IN METAVERSE AND METHOD THEREOF

(71) Applicant: Samsung Electronics Co., Ltd., Suwon-si (KR)

(72) Inventors: Youngjun Seo, Suwon-si (KR); Yongsuk Kwon, Suwon-si (KR); Sooyoung Nam, Suwon-si (KR); Munhwan Choi, Suwon-si (KR); Sunmin Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 18/496,139

(22) Filed: Oct. 27, 2023

(65) Prior Publication Data

US 2024/0143267 A1 May 2, 2024

Related U.S. Application Data

(63) Continuation of application No. PCT/KR2023/016595, filed on Oct. 25, 2023.

(30) Foreign Application Priority Data

Oct. 28, 2022 (KR) .......................... 10-2022-0141658
Oct. 24, 2023 (KR) .......................... 10-2023-0143220

(51) Int. Cl.
 *G06T 11/00* (2006.01)
 *G06F 3/14* (2006.01)
 (Continued)

(52) U.S. Cl.
 CPC ......... *G06F 3/1454* (2013.01); *G06K 7/1417* (2013.01); *G06T 11/00* (2013.01); *G06V 20/50* (2022.01)

(58) Field of Classification Search
 None
 See application file for complete search history.

(56) References Cited

U.S. PATENT DOCUMENTS 10,925,567 B2 *  2/2021  Chan .......................... A61B 6/54
2012/0120102 A1  5/2012  Yu et al.
(Continued)

FOREIGN PATENT DOCUMENTS

KR   10-2012-0053420 A   5/2012
KR   10-2017-0058756 A   5/2017
(Continued)

OTHER PUBLICATIONS

International Search Report dated Jan. 18, 2024, issued in International Patent Application No. PCT/KR2023/016595.

*Primary Examiner* — Yanna Wu
(74) *Attorney, Agent, or Firm* — Jefferson IP Law, LLP

(57) ABSTRACT

An electronic device is provided. The electronic device includes a display, a communication module, and at least one processor operatively connected to the display and the communication module, wherein the at least one processor is configured to activate a virtual reality (VR) application, identify at least one marker image included in a VR content based on displaying the VR content related to a first external device connected through the communication module while the VR application is executed, identify an area for mirroring a screen of the first external device based on the at least one marker image, based on matching of account information included in the at least one marker image and account information of the VR application, and display a screen of the first external device on the area.

20 Claims, 23 Drawing Sheets

(51) Int. Cl.
*G06K 7/14* (2006.01)
*G06V 20/50* (2022.01)

(56) References Cited

U.S. PATENT DOCUMENTS

| | | |
|---|---|---|
| 2016/0147492 A1 | 5/2016 | Fugate et al. |
| 2017/0092010 A1 | 3/2017 | Hato |
| 2017/0307889 A1 | 10/2017 | Newman |
| 2020/0074962 A1 | 3/2020 | Norieda et al. |
| 2020/0183969 A1 | 6/2020 | Wiesel et al. |
| 2021/0034222 A1 | 2/2021 | Brems et al. |
| 2021/0356743 A1 | 11/2021 | Muldoon et al. |
| 2022/0067740 A1* | 3/2022 | Patel ....................... G06F 21/44 |

FOREIGN PATENT DOCUMENTS

| | | |
|---|---|---|
| KR | 10-2018-0007121 A | 1/2018 |
| KR | 10-2018-0075098 A | 7/2018 |
| KR | 10-2019-0035373 A | 4/2019 |
| KR | 10-2019-0094874 A | 8/2019 |
| KR | 10-2020-0000636 A | 1/2020 |
| KR | 10-2020-0048414 A | 5/2020 |

* cited by examiner

ELECTRONIC DEVICE FOR USING EXTERNAL DEVICE IN METAVERSE AND METHOD THEREOF

CROSS-REFERENCE TO RELATED APPLICATION(S)

This application is a continuation application, claiming priority under § 365(c), of an International application No. PCT/KR2023/016595, filed on Oct. 25, 2023, which is based on and claims the benefit of a Korean patent application number 10-2022-0141658, filed on Oct. 28, 2022, in the Korean Intellectual Property Office, and of a Korean patent application number 10-2023-0143220, filed on Oct. 24, 2023, in the Korean Intellectual Property Office, the disclosure of each of which is incorporated by reference herein in its entirety.

TECHNICAL FIELD

The disclosure relates to an electronic device for using an external device in the metaverse and a method for controlling same.

BACKGROUND ART

Metaverse-related contents have been actively distributed. For example, metaverse-related contents based on a virtual space in which a designated activity is performed through an avatar may be provided. For example, metaverse-related contents based on an augmented reality that allow additional information about the real environment to be displayed or other objects to be superimposed on the real environment may be provided. As metaverse-related content advances, multiple users may access metaverse services.

Between users accessing the metaverse services, a conversation may be conducted based on chatting and voice chatting provided in the metaverse service or a conversation may be conducted in an environment, such as video chatting as avatars of multiple users are located in one designated virtual space.

Various services and additional functions provided through wearable electronic devices, such as augmented reality (AR) glasses, virtual reality (VR) glasses, and head mounted display (HMD) devices, have been gradually increased. Communication service providers or electronic device manufacturers competitively develop an electronic device for providing various functions and differentiation from other businesses to improve effective values of such electronic device and satisfy various desires of users. Therefore, various functions provided through wearable electronic devices have been increasingly advanced.

AR glasses or VR glasses may provide a user with realistic experiences by displaying virtual images while worn on the user's head. AR glasses or VR glasses may replace the usability of a smartphone in various fields, such as game entertainment, education, and social networking services. The user may be provided with contents similar to the real world through AR glasses or VR glasses mounted on the head and feel as if he or she were staying in a virtual world through interaction.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Aspects of the disclosure are to address at least the above-mentioned problems and/or disadvantages and to provide at least the advantages described below. Accordingly, an aspect of the disclosure is to provide an electronic device for using an external device in the metaverse and a method for controlling same.

Additional aspects will be set forth in part in the description which follows and, in part, will be apparent from the description, or may be learned by practice of the presented embodiments.

Technical Solution

According to an embodiment of the disclosure, an electronic device is provided. The electronic device includes a display, a communication module, and at least one processor operatively connected to the display and the communication module.

According to an embodiment of the disclosure, the at least one processor executes a virtual reality (VR) application.

According to an embodiment of the disclosure, the at least one processor identifies, based on displaying of a VR content related to a first external device connected through the communication module while the VR application is executing, at least one marker image included in the VR content.

According to an embodiment of the disclosure, the at least one processor identifies an area for mirroring a screen of the first external device based on at least one marker image based on matching of account information included in the at least one marker image and account information of the VR application.

According to an embodiment of the disclosure, the at least one processor displays a screen of the first external device on the area.

According to an embodiment of the disclosure, the first external device is registered to a server related to the account of the VR application through the first external device.

According to an embodiment of the disclosure, the VR content is generated from the server, based on an external shape of the first external device.

According to an embodiment of the disclosure, the VR content is displayed on an execution screen of the VR application provided by the server.

According to an embodiment of the disclosure, the marker image is generated from the server in association with the first external device and the account based on registration of the first external device to the server.

According to an embodiment of the disclosure, the marker image is included in an execution screen of the VR application provided by the server.

According to an embodiment of the disclosure, the at least one processor displays, based on matching of the account information of the VR application and account information included in a marker image among a plurality of marker images included in an execution screen of the VR application, a screen of the first external device by replacing the marker image.

According to an embodiment of the disclosure, the at least one processor displays, based on non-matching of the account information of the VR application and account information included in a marker image among the plurality of marker images, the marker image.

According to an embodiment of the disclosure, the at least processor transmits, based on a user input received on a screen of the first external device displayed on the area, control information for controlling the first external device to the first external device.

According to an embodiment of the disclosure, the at least one processor acquires, based on coordinate information of the area on which a screen of the first external device is displayed, coordinate information of the user input related to a location of the user input within the screen of the first external device.

According to an embodiment of the disclosure, the at least one processor transmits the coordinate information of the user input and information on a type of the user input to the first external device.

According to an embodiment of the disclosure, the at least one processor replaces a first screen with a second screen in a state of displaying the first screen of the first external device, based on reception of screen information on the second screen different from the first screen from the first external device.

According to an embodiment of the disclosure, the at least one processor displays a second VR content related to a second external device connected through the communication module.

According to an embodiment of the disclosure, the at least one processor identifies, based on identification of at least one second marker image included in the second VR content, a second area for mirroring a screen of the second external device.

According to an embodiment of the disclosure, the at least one processor displays a screen of the second external device on the second area.

According to an embodiment of the disclosure, the VR content is disposed on a body portion of a virtual person corresponding to the account and is determined to be displayed based on a behavior of the virtual person.

According to an embodiment of the disclosure, a server is provided. The server includes a communication module, a memory, and at least one processor operatively connected to the communication module and the memory.

According to an embodiment of the disclosure, in case that an account registration request for a VR application is received from an external device through the communication module, the at least one processor acquires external shape information corresponding to the external device from among a plurality of pieces of external shape information of electronic devices stored in the memory.

According to an embodiment of the disclosure, the at least one processor generates a marker image based on the account of which registration has been requested and external shape information of the external device.

According to an embodiment of the disclosure, the at least one processor transmits an execution screen of the VR application including the marker image to a wearable electronic device connected through the communication module.

According to an embodiment of the disclosure, a control method of an electronic device is provided. The control method of an electronic device includes an operation of executing a virtual reality (VR) application.

According to an embodiment of the disclosure, the control method of the electronic device includes an operation of identifying, based on displaying of a VR content related to a first external device connected through the communication module while the VR application is executing, at least one marker image included in the VR content.

According to an embodiment of the disclosure, the control method of the electronic device includes an operation of identifying an area for mirroring a screen of the first external device based on at least one marker image based on matching of account information included in the at least one marker image and account information of the VR application.

According to an embodiment of the disclosure, the control method of the electronic device includes an operation of displaying a screen of the first external device on the area.

According to an embodiment of the disclosure, the first external device is registered to a server related to the account of the VR application through the first external device.

According to an embodiment of the disclosure, the VR content is generated from the server, based on an external shape of the first external device.

According to an embodiment of the disclosure, the VR content is displayed on an execution screen of the VR application provided by the server.

According to an embodiment of the disclosure, the marker image is generated from the server in association with the first external device and the account based on registration of the first external device to the server.

According to an embodiment of the disclosure, the marker image is included in an execution screen of the VR application provided by the server.

According to an embodiment of the disclosure, the operation of displaying, based on matching of the account information of the VR application and account information included in a marker image among a plurality of marker images included in an execution screen of the VR application, the screen of the first external device on the area displays a screen of the first external device by replacing the marker image.

According to an embodiment of the disclosure, the operation of displaying, based on non-matching of the account information of the VR application and account information included in a marker image among the plurality of marker, the screen of the first external device on the area displays the marker image.

According to an embodiment of the disclosure, the control method of the electronic device further includes an operation of transmitting, based on a user input received on a screen of the first external device displayed on the area, control information for controlling the first external device to the first external device.

According to an embodiment of the disclosure, the operation of transmitting control information for controlling the first external device to the first external device acquires, based on coordinate information of the area on which a screen of the first external device is displayed, coordinate information of the user input related to a location of the user input within the screen of the first external device.

According to an embodiment of the disclosure, the operation of transmitting control information for controlling the first external device to the first external device transmits the coordinate information of the user input and information on a type of the user input to the first external device.

According to an embodiment of the disclosure, the control method of the electronic device further includes an operation of replacing a first screen with a second screen in a state of displaying the first screen of the first external device, based on reception of screen information on the second screen different from the first screen from the first external device.

According to an embodiment of the disclosure, the control method of the electronic device further includes an operation of displaying a second VR content related to a second external device connected through the communication module.

According to an embodiment of the disclosure, the control method of the electronic device further includes an operation of identifying, based on identification of at least one second marker image included in the second VR content, a second area for mirroring a screen of the second external device.

According to an embodiment of the disclosure, the control method of the electronic device further includes an operation of displaying a screen of the second external device on the second area.

According to an embodiment of the disclosure, the VR content is disposed on a body portion of a virtual person corresponding to the account and is determined to be displayed based on a behavior of the virtual person.

According to an embodiment of the disclosure, in case that an account registration request for a VR application is received from an external device through the communication module, a control method of a server includes an operation of acquiring external shape information corresponding to the external device from among a plurality of pieces of external shape information of electronic devices stored in the memory.

According to an embodiment of the disclosure, the control method for the server is provided. The control method for the server includes an operation of generating a marker image based on the account of which registration has been requested and external shape information of the external device.

According to an embodiment of the disclosure, the control method for the server includes an operation of transmitting an execution screen of the VR application including the marker image to a wearable electronic device connected through the communication module.

According to an embodiment of the disclosure, a non-transitory computer-readable recording medium is provided. The non-transitory computer-readable recording medium stores at least one program, wherein the at least one program includes instructions for an electronic device to execute a virtual reality (VR) application.

According to an embodiment of the disclosure, the at least one program includes instructions for the electronic device to identify, based on displaying of a VR content related to a first external device connected through the communication module while the VR application is executing, at least one marker image included in the VR content.

According to an embodiment of the disclosure, the at least one program includes instructions for the electronic device to identify an area for mirroring a screen of the first external device based on at least one marker image based on matching of account information included in the at least one marker image and account information of the VR application.

According to an embodiment of the disclosure, the at least one program includes instructions for the electronic device to display a screen of the first external device on the area.

According to an embodiment of the disclosure, the first external device is registered to a server related to the account of the VR application through the first external device.

According to an embodiment of the disclosure, the VR content is generated from the server, based on an external shape of the first external device.

According to an embodiment of the disclosure, the VR content is displayed on an execution screen of the VR application provided by the server.

According to an embodiment of the disclosure, the marker image is generated from the server in association with the first external device and the account based on registration of the first external device to the server.

According to an embodiment of the disclosure, the marker image is included in an execution screen of the VR application provided by the server.

According to an embodiment of the disclosure, the at least one program includes instructions for the electronic device to display, based on matching of the account information of the VR application and account information included in a marker image among a plurality of marker images included in an execution screen of the VR application, a screen of the first external device by replacing the marker image.

According to an embodiment of the disclosure, the at least one program includes instructions for the electronic device to display, based on non-matching of account information included in a marker image and the account information of the VR application among the plurality of marker, the marker image.

According to an embodiment of the disclosure, the at least one program includes instructions for the electronic device to transmit, based on a user input received on a screen of the first external device displayed on the area, control information for controlling the first external device to the first external device.

According to an embodiment of the disclosure, the at least one program includes instructions for the electronic device to acquire, based on coordinate information of the area on which a screen of the first external device is displayed, coordinate information of the user input related to a location of the user input within the screen of the first external device.

According to an embodiment of the disclosure, the at least one program includes instructions for the electronic device to transmit the coordinate information of the user input and information on a type of the user input to the first external device.

According to an embodiment of the disclosure, the at least one program includes instructions for the electronic device to replace a first screen with a second screen in a state of displaying the first screen of the first external device, based on reception of screen information on the second screen different from the first screen from the first external device.

According to an embodiment of the disclosure, the at least one program includes instructions for the electronic device to display a second VR content related to a second external device connected through the communication module.

According to an embodiment of the disclosure, the at least one program includes instructions for the electronic device to identify, based on identification of at least one second marker image included in the second VR content, a second area for mirroring a screen of the second external device.

According to an embodiment of the disclosure, the at least one program includes instructions for the electronic device to display a screen of the second external device on the second area.

According to an embodiment of the disclosure, the VR content is disposed on a body portion of a virtual person corresponding to the account and is determined to be displayed based on a behavior of the virtual person.

According to an embodiment of the disclosure, a non-transitory computer-readable recording medium is provided. The non-transitory computer-readable recording medium stores at least one program, wherein the at least one program includes instructions for a server to execute a virtual reality (VR) application. There is included instructions for acquiring external shape information corresponding to an external device from among a plurality of pieces of external shape information of electronic devices stored in the memory in case that an account registration request for a VR application is received from the external device through the communication module.

According to an embodiment of the disclosure, the at least one program includes instructions for the server to generate a marker image based on the account of which registration has been requested and external shape information of the external device.

According to an embodiment of the disclosure, the at least one program includes instructions for the server to transmit an execution screen of the VR application including the marker image to a wearable electronic device connected through the communication module.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
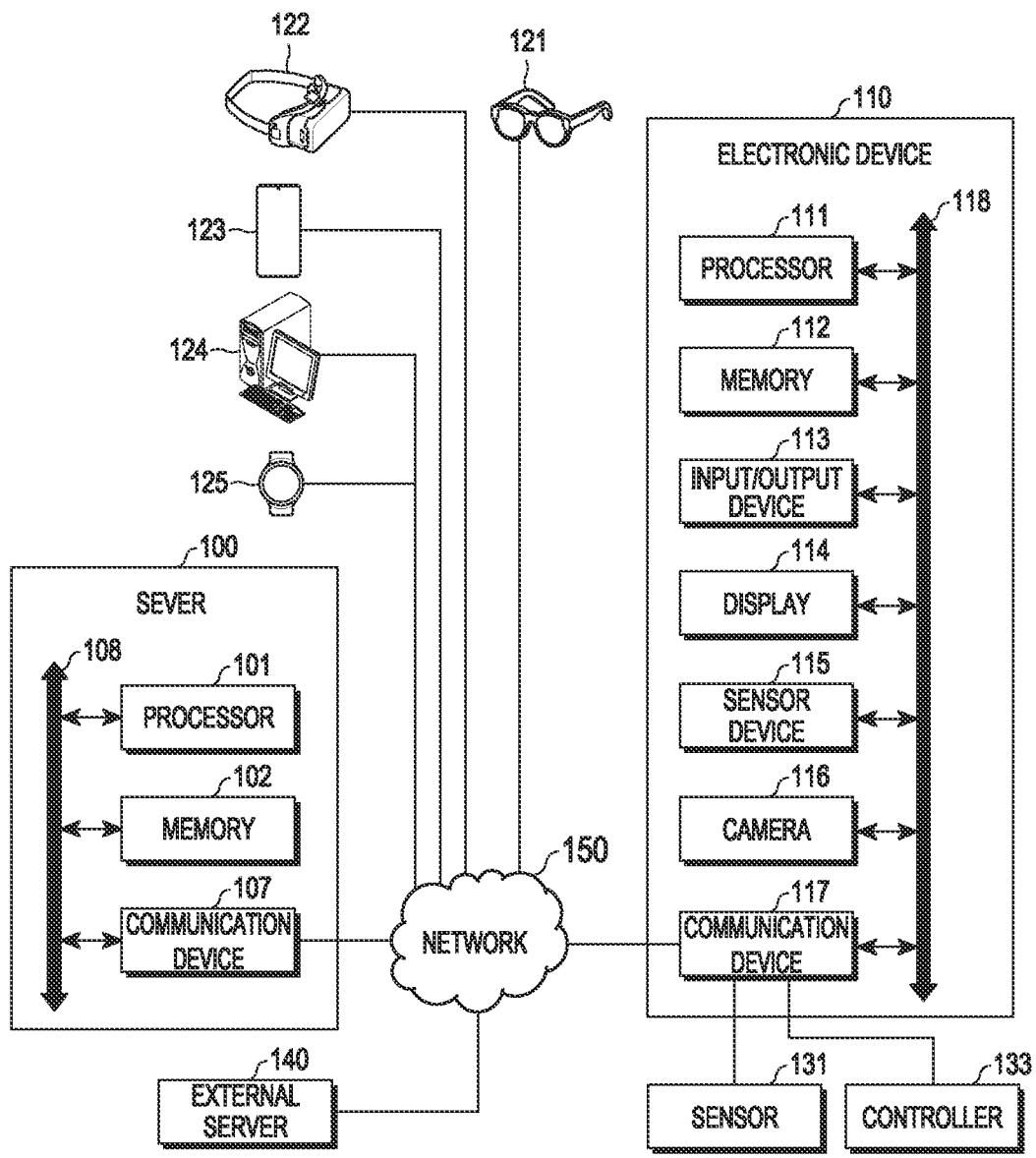
FIG. 1 is a flowchart illustrating an artificial reality provision system according to an embodiment of the disclosure.

FIG. 1 is a flowchart illustrating an artificial reality provision system according to an embodiment of the disclosure.

Referring to FIG. 1, according to an embodiment of the disclosure, the artificial reality provision system may include at least one of a server 100, an electronic device 110, at least one external electronic device 121, 122, 123, 124, or 125, or an external server 140.

According to an embodiment of the disclosure, the server 100 may generate data for expressing an artificial reality (e.g., at least one of an augmented reality (augmented reality environment) or a virtual reality (virtual reality environment)). The server 100 may provide a content capable of increasing user immersion in addition to the augmented reality or virtual reality and the content may be referred to as a content for metaverse. The server 100 may include a processor 101, a memory 102, and/or a communication device 107. It is merely illustrative that the sever 100 includes the processor 101, the memory 102, and/or the communication device 107, and at least a portion of operations of the server 100 may be realized by a cloud server. The server 100 may be implemented as a distributed server and it will be understood by those skilled in the art that there is no limitation as to the implementation form of the server.

According to an embodiment of the disclosure, the processor 101 may execute an instruction included in a program (or application) stored in the memory 102. The processor 101 may include, for example, a central processing unit (CPU), a graphic processing unit (GPU), a neural processing unit (NPU), a tensor processing unit (TPU), a digital signal processor (DSP), an application-specific integrated circuit (ASIC), a field programmable gate array (FPGA), and/or a programmable logic device but is not limited to a means capable of executing a program (or instruction). The processor 101 may execute a program for an artificial reality. The memory 102 may store a program for an artificial reality. According to an embodiment of the disclosure, the memory 102 may include a volatile memory and/or non-volatile memory and include, for example, a hard disc storage device, a random access memory (RAM), a read-only memory (ROM), and/or a flash memory, but this is illustrative and is not limited thereto. The program for an artificial reality is a program for a server, may cause, for example, generation of data for expressing an artificial reality, provision of generated data, identification of a user input, and/or performing of generation and provision of data for expressing an artificial reality undated based on an identified user input, and may include an instruction corresponding to at least a portion of operations performed by the server 100 of the disclosure. The communication device 107 may support establishment of a communication channel between the server 100 and the electronic device 110 through a network 150 and communication performance through an established communication channel. The communication device 107 may be a device capable of providing a wide area network (e.g., the Internet) but is not limited thereto. An operation performed by the server 100 may be performed by, for example, the processor 101 or performed by other hardware through control of the processor 101. An instruction causing performing of an operation by the server 100 may be stored in the memory 102. The processor 101, the memory 102, and/or the communication device 107 may transmit/receive data through a bus 108 (or communication interface or network) of the server 100.

According to an embodiment of the disclosure, the electronic device 110 may perform at least one operation (e.g., provision of a visual content (e.g., an image), provision of an auditory content (e.g., a sound), provision of a tactile content (e.g., vibration), and/or provision of an olfactory content (e.g., a smell) may be included but have no limitation) for expressing an artificial reality by using data for expressing an artificial reality. A user who owns or wears the electronic device 110 may experience an artificial reality based on a content provided from the electronic device 110. The electronic device 110 may include at least one of a processor 111, a memory 112, an input/output device 113, a display 114, a sensor device 115, a camera 116, or a communication device 117. The processor 111 may include, for example, a CPU, a GPU, a TPU, a DSP, a FPGA, and/or a programmable logic device but is not limited to a means capable of executing a program (or instruction). For example, the processor 111 may execute a program for an artificial reality. The program for an artificial reality is a program for a client, may cause reception of data for expressing an artificial reality from the server 100, performance of at least one operation (e.g., provision of a visual content (e.g., an image), provision of an auditory content (e.g., a sound), provision of a tactile content (e.g., vibration), and/or provision of an olfactory content (e.g., a smell) may be included but have no limitation) for expressing an artificial reality based on received data, identification of a user input, and/or performance of transmission of a user input (or instruction corresponding to a user input) to the server 100, and may include an instruction corresponding to at least a portion of operations performed by the electronic device 110. According to an embodiment of the disclosure, the memory 112 may include a volatile memory and/or non-volatile memory and include, for example, a hard disc storage device, RAM, ROM, and/or a flash memory, but this is illustrative and is not limited thereto. According to an embodiment of the disclosure, the input/output device 113 may include a touch pad, a button, a mouse, a digital pen, and/or a microphone, but is not limited as long as it is a device for receiving (or sensing) a user input. For example, a touch screen panel corresponding to one example of the input/output device 113 may be integrally implemented with the display 114. The input/output device 113 may include a speaker, a haptic module, and/or a light-emitting module but is not limited as long as it is a device for outputting a content related to an artificial reality. According to an embodiment of the disclosure, the sensor device 115 may include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and an illuminance sensor. According to an embodiment of the disclosure, the camera 116 may include one or more lenses, image sensors, image signal processors, or flashes. According to an embodiment of the disclosure, the communication device 117 may support establishment of a communication channel between the server 100 and the electronic device 110 through a network 150 and communication performance through an established communication channel. The communication device 117 may be a device capable of providing a wide area network (e.g., the Internet) but is not limited thereto. The communication device 117 may support wired communication and/or wireless communication. For example, the communication device 117 may support near field communication (e.g., near field communication, such as Bluetooth, wireless fidelity (Wi-Fi) direct, or infrared data association (IrDA)). The communication device 117 may transmit or receive data to or from an external sensor 131 and/or an external controller 133 based on near field communication. For example, in case that the electronic device 110 is implemented as a stand-alone type, the communication device 117 may support a function to wirelessly access the network 150. The communication device 117 may support cellular communication, such as long term Evolution (LTE), fifth generation (5G), and sixth generation (6G), and/or institute of electrical and electronics engineers (IEEE) 802 series-based communication (e.g., it may be referred to as Wi-Fi). The communication device 117 may be implemented to support wired communication but is not limited to an implementation scheme. In case that the electronic device 110 is implemented as a non-stand along type, the electronic device 110 may perform communication with the server 100 through a relay device connectable to the network 150. Here, the communication device 117 may support near field communication, such as Bluetooth, wireless fidelity (Wi-Fi) direct, or infrared data association (IrDA), and perform communication with the server 100 through a relay device by using near filed communication. The external sensor 131 may include a gesture sensor, a gyro sensor, a barometric pressure sensor, a magnetic sensor, an acceleration sensor, a grip sensor, a proximity sensor, a color sensor, an IR sensor, a biometric sensor, a temperature sensor, a humidity sensor, and an illuminance sensor. An operation performed by the electronic device 110 may be performed by, for example, the processor 111 or performed by other hardware through control of the processor 111. An instruction causing performing of an operation by the electronic device 110 may be stored in the memory 112. The processor 111, the memory 112, the input/output device 113, the display 114, the sensor device 115, the camera 116, and/or the communication device 117 may transmit/receive data through a bus 118 (or communication interface or network) of the electronic device 110. Transmitting/receiving data by the server 100 and the electronic device 110 based on an application for an artificial reality is merely illustrative and it will be understood by those skilled in the art that the server 100 and the electronic device 110 may transmit or receive at least a portion of data based on a web.

According to an embodiment of the disclosure, the external sensor 131 may include, for example, a ring-type device, a bracelet-type device, or a head-mounted device but is not limited types and/or a part of the user's body to which the external sensor is attached. The external sensor 131 may provide data detected based on a near field communication to the electronic device 110. The controller 133 may include a touch pad, a button, a mouse, a digital pen, and/or a microphone, but is not limited as long as it is a device for receiving (or sensing) a user input. The controller 133 may provide data acquired based on a near field communication to the electronic device 110. In an embodiment of the disclosure, the controller 133 may further include at least one additional sensor in addition to a device for receiving a user input. In this case, the controller 133 may provide data related to a user input and/or sensing data to the electronic device 110 based on a near field communication.

According to an embodiment of the disclosure, the server 100 may transmit or receive data to or from at least one external electronic device 121, 122, 123, 124, or 125. The server 100 may perform an update to at least one external electronic device 121, 122, 123, 124, or 125 based on data and/or transmit data for expressing a changed artificial reality to the electronic device 110. The electronic device 110 may perform at least one operation to express an artificial reality based on data. Accordingly, in case that multiple users exist in one artificial reality, an artificial reality to which an operation of one user is reflected may be provided to other users.

According to an embodiment of the disclosure, the external server 140 may transmit or receive data to or from the server 100 through the network 150. The external server 140 may correspond to a server for supporting the same application (or the same artificial reality) as the server 100. Alternatively, the external sensor 140 may correspond to a server for supporting a different application (or a different artificial reality) from the server 100. Here, the server 100 may convert data of the external server 140 into an application (or artificial reality) format supported the server 100. The server 100 may transmit data for expressing an artificial reality to which converted data has been reflected to the electronic device 110. As described above, the server 100 may interact with an artificial reality different from an artificial reality supported thereby and this function may be referred as a multiverse function.

According to an embodiment of the disclosure, the electronic device 110 may correspond to a head mounted device (HMD) for supporting a virtual reality or a smartphone connectible to a structure which may be fixed to the head. A user may observe, with both eyes, each of an image for a left eye and an image for a right eye for expressing a virtual reality displayed on the display 114 while wearing the HMD or the structure to which a smartphone is connected, on his or her head. Alternatively, the user may observe an image for expressing a virtual reality displayed on the display 114 of the electronic device 110 while not wearing the electronic device 110 on the head. Here, the electronic device 110 may be implemented as a smartphone, a tablet, a general-purpose computer, or a smart mirror, but is not limited thereto.

According to an embodiment of the disclosure, the server 100 may generate data for expressing at least one space (or a scene gazing the corresponding space) of a virtual reality. For example, the server 100 may receive information on a first user (e.g., account information of the first user and/or information for authentication) from the electronic device 110. The server 100 may perform a log-in process of the first user based on the information on the first user. The server 100 may identify a space corresponding to the first user in the virtual reality. For example, the server 100 may identify a space privately allocated to the first user. For example, the server 100 may identify a space corresponding to a location of the first user in an open space. For example, the server 100 may identify a space corresponding to a user input. There is no limitation to a method for the server 100 to identify the space corresponding to the location of the first user. For example, at least one object and/or an avatar (or character) corresponding to the user may be included in the identified space. In case that a point of view of a scene is a first person point of view, data for expression may be related to a scene in which the identified space is viewed from the user's point of view. In some cases, the scene viewing the identified space may not include the avatar (or character) corresponding to the first user or may include only a portion (e.g., a hand or the like) of the body, without limitation thereto, or may include a back of the avatar. In case that a point of view of a scene is a third person point of view, data for expression may be related to a scene viewing a space including the avatar (or character) corresponding to the user in one direction.

According to an embodiment of the disclosure, a scene viewed from the user's point of view may include the avatar corresponding to another user. For example, a second user may access the server 100 by using an external electronic device 122. The server 100 may generate data for expressing an artificial reality which is used by the first user and the second user together. For example, in case that both the first user and the second user exist in a specific space, the server 100 may generate data for expressing an artificial reality which is used by the first user and the second user together. For example, in case that a point of view of a scene is a first person point of view, a scene for the first user may include at least a portion of an avatar of the second user. For example, in case that a point of view of a scene is a third person point of view, a scene for the first user may include at least a portion of a first avatar (or may be referred to as a character) corresponding to the first user and/or at least a portion of a second avatar (or character) corresponding to the second user. In an embodiment of the disclosure, at least a portion of a screen displayed on the electronic device 110 may be provided to the server 100. At least a portion (or an object corresponding to at least a portion) of a screen displayed on the electronic device 110 may be disposed in a virtual reality.

According to an embodiment of the disclosure, the server 100 may receive a user input and/or a command corresponding to a user input from the electronic device 110. For example, the electronic device 110 may identify a user input through the input/output device 113. For example, the electronic device 110 may identify a user input through the embedded sensor device 115. For example, the electronic device 110 may acquire a user input from the external sensor 131 and/or the controller 133 connected through the communication device 117. The processor 111 may identify movement information of the electronic device 110 as a user input, based on sensing data identified through the sensor device 115. For example, the electronic device 110 may acquire a user input from the external sensor 131 and/or the controller 133 connected through the communication device 117.

According to an embodiment of the disclosure, the electronic device 110 may identify a command based on a user input. The command may include, for example, movement within a virtual reality, designation of an object within a virtual reality, manipulation of an object within a virtual reality, and/or interaction with other avatars, but is not limited thereto. The electronic device 110 may transmit a command to the server 100. For example, the electronic device 110 may transmit a user input to the server 100 without performing identification of a command based on the user input and in this case, the server 100 may identify the command based on the user input.

According to an embodiment of the disclosure, the server 100 may update a virtual reality space based on the command or convert the virtual reality space into other spaces. For example, in case that the command corresponds to designation of an object, a space may be updated to reflect a function connected to the designated object. For example, in case that the command corresponds to designation of an object, a space may be updated to change a location of the corresponding object. For example, in case that the command corresponds to performing of an avatar operation, a space may be updated so that an avatar of a user performs a corresponding reaction. For example, in case that the command corresponds to interaction with other avatars, a space may be updated so that the corresponding avatar performs a corresponding reaction. For example, in case that the command corresponds to movement, a space for expression may be changed to another space. It will be understood by those skilled in the art that that is no limitation to a space update and/or change of the virtual reality based on the command. The server 100 may provide an auditory content, a tactile content, and/or an olfactory content in addition to the update and/or change of a visual content. The server 100 may relay a text for voice data and/or chatting between users. For example, the server 100 may perform the space update and/or change by using relation information between the command and the update and/or change. For example, the server 100 may store an artificial model configured to receive a user input and/or command as an input value and output a space update and/or change as an output value. The server 100 may perform the space update and/or change based on the output value of the artificial model. For example, the server 100 may store an artificial model configured to provide a space update and/or change based on a context of the corresponding space without a user input. The server 100 may perform the space update and/or change based on the context of the corresponding space by using the artificial model.

According to an embodiment of the disclosure, the server 100 may transmit data for expressing the undated space and/or data for expressing the changed space to the electronic device 110. The server 100 may transmit data for expressing the undated space and/or data for expressing the changed space to an external electronic device 122 corresponding to the second user. Accordingly, the external electronic device 122 may express a virtual reality to which a space undated by the first user of the electronic device 110 has been reflected. In addition, based on information (e.g., a user input and/or command) transmitted from the external electronic device 122 to the server 100, the server 100 may update a space which is used by both the first user and the second user together (or in which the first user and the second user coexist). The server 100 may transmit data for expressing the updated space to the electronic device 110. The electronic device 110 may express the updated space based on the received data. As described above, the server 100 may share a space updated corresponding to one user with an electronic device of another user corresponding to the space. For example, an update and/or change in time-series space may be referred to as a user's experience. The server 100 and/or the electronic device 110 may store at least one piece of data related to the user's experience in the memory 102 and/or 112. For example, the server 100 may store at least one piece of data related to the user's experience for each user (e.g., for each user account). For example, the server 100 and/or the electronic device 110 may store data for expressing a time point of the user's experience in the memory 102 and/or 112. For convenience of description, it may be expressed as performing capturing with respect to the user's experience. The server 100 may store data related to the user's experience and this may be referred to as life logging. The server 100 may additionally store data related to the user. For example, the server 100 may receive at least one piece of sensing data from the electronic device 110 and save same in time series or update a final value. The server 100 may generate a user (e.g., an avatar) in a virtual reality corresponding to the user in the real world based on the at least one piece of sensing data, and this may be referred to as digital twin.

According to an embodiment of the disclosure, the electronic device 110 may provide a content for an augmented reality for expressing at least one visual object which may be superimposed on the real environment viewed by a specific user. It will be understood by those skilled in the art that at least a portion of operations of the server 100 and/or the electronic device 110 described in an embodiment with respect to the virtual reality may be performed by the server 100 and/or the electronic device 110 described in an embodiment with respect to the augmented reality and vice versa. According to an embodiment of the disclosure, the electronic device 110 may include a glasses-type electronic device for supporting the augmented reality, a smart lens, or a smartphone capable of displaying a captured image in real time. A user may observe a visual object displayed on a transparent display (or semi-transparent display) of the glasses-type electronic device or smart lens, together with the real environment while wearing the glasses-type electronic device or smart lens. Alternatively, the user may observe an image captured by a smartphone and a visual object displayed to be superimposed on the image.

According to an embodiment of the disclosure, the electronic device 110 may acquire a front image through the camera 116 (e.g., a camera facing the front side). The electronic device 110 may transmit a front image, a portion of the front image, or 3D modeling data acquired based on the front image to the server 100 through the communication device 117. The electronic device 110 may identify an orientation of the electronic device 110 based on a capture image and/or sensing data by the sensor device 115. The electronic device 110 may transmit data on the orientation of the electronic device 110 through the communication device 117. The electronic device 110 may acquire a captured image of a user's eye through the camera 116 (e.g., a camera facing the rear side). The electronic device 110 may identify a user's gaze based on the captured image of the eye. The electronic device 110 may transmit data on the user's gaze through the communication device 117.

According to an embodiment of the disclosure, the server 100 may generate data for expressing at least one visual object which may be superimposed on the real environment viewed by a specific user as data for expressing the artificial reality. The server 100 may analyze data (data related to the front image, the orientation of the electronic device 110, and/or the user's gaze) received from the electronic device 110, for example, and identify at least one visual object based on a result of the analysis. The server 100 may transmit data for expressing the at least one visual object to the electronic device 110 through the communication device 107. The at least one visual object may be displayed by, for example, the display 114 of the electronic device 110 and the user may observe the at least one visual object superimposed on the real environment. For example, the visual object may have information and/or a form related to an object disposed in the real environment. In this case, the electronic device 110 may display the visual object so that the user may observe as if the visual object were located in the vicinity of an object placed in the real environment.

According to an embodiment of the disclosure, the electronic device 110 may identify a user input. For example, a user input may be identified through the input/output device 113 included in the electronic device 110 and/or through the external sensor 131 and/or the controller 133. The user input may cause, for example, designation and/or manipulation of the visual object to be displayed. The electronic device 110 may transmit the user input and/or a command corresponding to the user input to the server 100. The server 100 may generate data for expressing the artificial reality based on the user input and/or the command corresponding to the user input. For example, the server 100 may identify that the user input is based on the designation and/or manipulation of the visual object and perform a change of the visual object, movement of the visual object, and/or provision of another visual object corresponding to a function of the visual object, without limitation thereto. The server 100 may transmit the data for expressing the artificial reality based on the user input and/or the command corresponding to the user input to the electronic device 110. A content related to the artificial reality may be provided based on the data for expressing the artificial reality in the electronic device 110. As described above, the server 100 and/or the electronic device 110 may provide a function for allowing the user to perform an interaction with respect to the visual object.

In an embodiment of the disclosure, the server 100 may generate an avatar (or character) corresponding to another user as data for expressing the artificial reality. The server 100 may transmit the avatar (or character) corresponding to another user to the electronic device 110. The electronic device 110 may display the avatar (or character) corresponding to another user by using the received data for expressing the artificial reality. Accordingly, the user may observe the avatar (or character) corresponding to another user to be superimposed on the real environment. Accordingly, the user may experience as if the avatar (or character) corresponding to another user were located in the real environment. The avatar (or character) corresponding to another user may be manipulated by a user input acquired by an external electronic device 121, 122, 123, 124, or 125, and/or manipulated by an artificial intelligence model stored in the server 110, but there is no limitation to a manipulation method of the avatar (or character). Based on manipulation of the avatar (or character), the server 100 may transmit data for expressing the manipulated avatar (or character) to the electronic device 110. The electronic device 110 may express the manipulated avatar (or character) based on the received data and accordingly, the user may experience as if the avatar (or character) corresponding to another user were operated in the real environment. As described above, the server 100 and/or the electronic device 110 may store a user's experience related to the augmented reality in the memory 102 and/or 112. For example, the server 100 may store at least one piece of data related to the user's experience related to the augmented reality for each user (e.g., for each user account). For example, the server 100 and/or the electronic device 110 may store data for expressing a time point of the user's experience related to the augmented reality in the memory 102 and/or 112.

Meanwhile, it is illustrative that the server 100 and the electronic device 110 generate data for expressing the artificial reality and express same. According to an embodiment of the disclosure, the electronic device 110 may generate data for expressing the artificial reality and/or generate data for the artificial reality based on data from an external electronic device 121, 122, 123, 124, and 125. Here, the electronic device 110 may generate data for expressing the artificial reality without data from the server 100.

Figure 2:
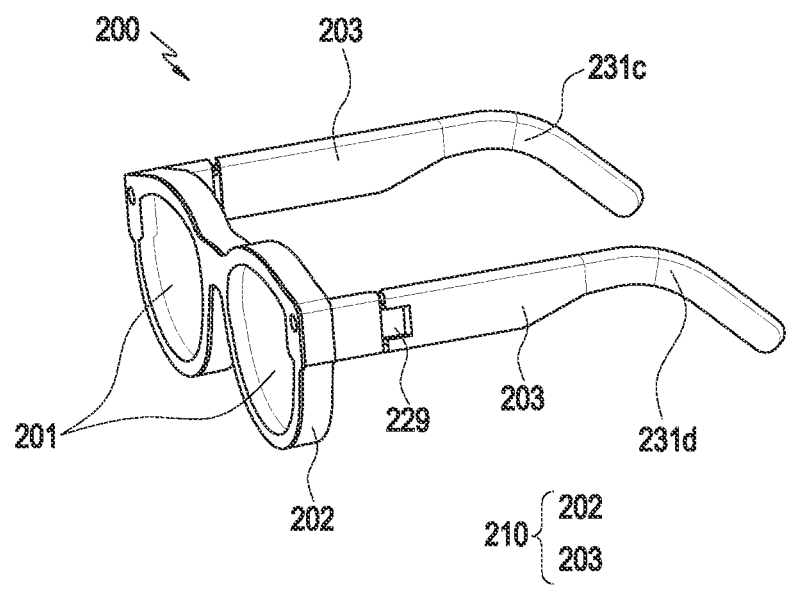
FIG. 2 is a perspective view illustrating an electronic device according to an embodiment of the disclosure.

FIG. 2 illustrates a perspective view of an electronic device 200 (e.g., the electronic device 110 in FIG. 1) according to an embodiment of the disclosure.

Referring to FIG. 2, the electronic device 200 is a glasses-type wearable electronic device and a user may recognize an object or environment therearound while wearing the electronic device 200. For example, the electronic device 200 may include a head mounting device (HMD) or smart glasses which may directly provide an image in front of the user's eye. The configurations of the electronic device 200 of FIG. 2 may be entirely or partially identical to that of the electronic device 110 of FIG. 1.

According to an embodiment of the disclosure, the electronic device 200 may include a housing 210 forming an exterior of the electronic device 200. The housing 210 may provide a space in which components of the electronic device 200 may be arranged. For example, the housing 210 may include a lens frame 202 and at least one wearing member 203.

According to an embodiment of the disclosure, the electronic device 200 may include at least one display member 201 capable of providing visual information to a user. For example, the display member 201 may include a module to which a lens, a display, a waveguide, and/or a touch circuit is mounted. According to an embodiment of the disclosure, the display member 201 may be formed to be transparent or translucent. According to an embodiment of the disclosure, the display member 201 may include translucent glass or a window member of which light transmittivity may be adjusted by adjusting a coloring density thereof. According to an embodiment of the disclosure, a pair of display members 201 may be provided and arranged to correspond to a right eye and a left eye, respectively while wearing the electronic device 200 on the user's body.

According to another embodiment of the disclosure, the lens frame 202 may receive at least a portion of the display member 201. According to another embodiment of the disclosure, the lens frame 202 may surround at least a portion of an edge of the display member 201. According to an embodiment of the disclosure, the lens frame 202 may locate at least one display member 201 to corresponding to the user's eye. According to an embodiment of the disclosure, the lens frame 202 may correspond to a rim of a typical eyeglass structure. According to an embodiment of the disclosure, the lens frame 202 may include at least one closed curved line for surrounding the display member 201.

According to an embodiment of the disclosure, the wearing member 203 may extend from the lens frame 202. For example, the wearing member 203 may extend from an end part of the lens frame 202 and may be supported by or located on the user's body (e.g., the ear) together with the lens frame 202. According to an embodiment of the disclosure, the wearing member 203 may be rotatably coupled to the lens frame 202 through a hinge structure 229. According to an embodiment of the disclosure, the wearing member 203 may include an internal surface 231c configured to face the user's body and an external surface 231d opposite to the internal surface.

According to an embodiment of the disclosure, the electronic device 200 may include the hinge structure 229 configured to allow the wearing member 203 to be foldable with respect to the lens frame 202. The hinge structure 229 may be disposed between the lens frame 202 and the wearing member 203. In a state of not wearing the electronic device 200, the user may fold the wearing member 203 to be partially overlap the lens frame 202 and carry or store same.

Figure 3A:
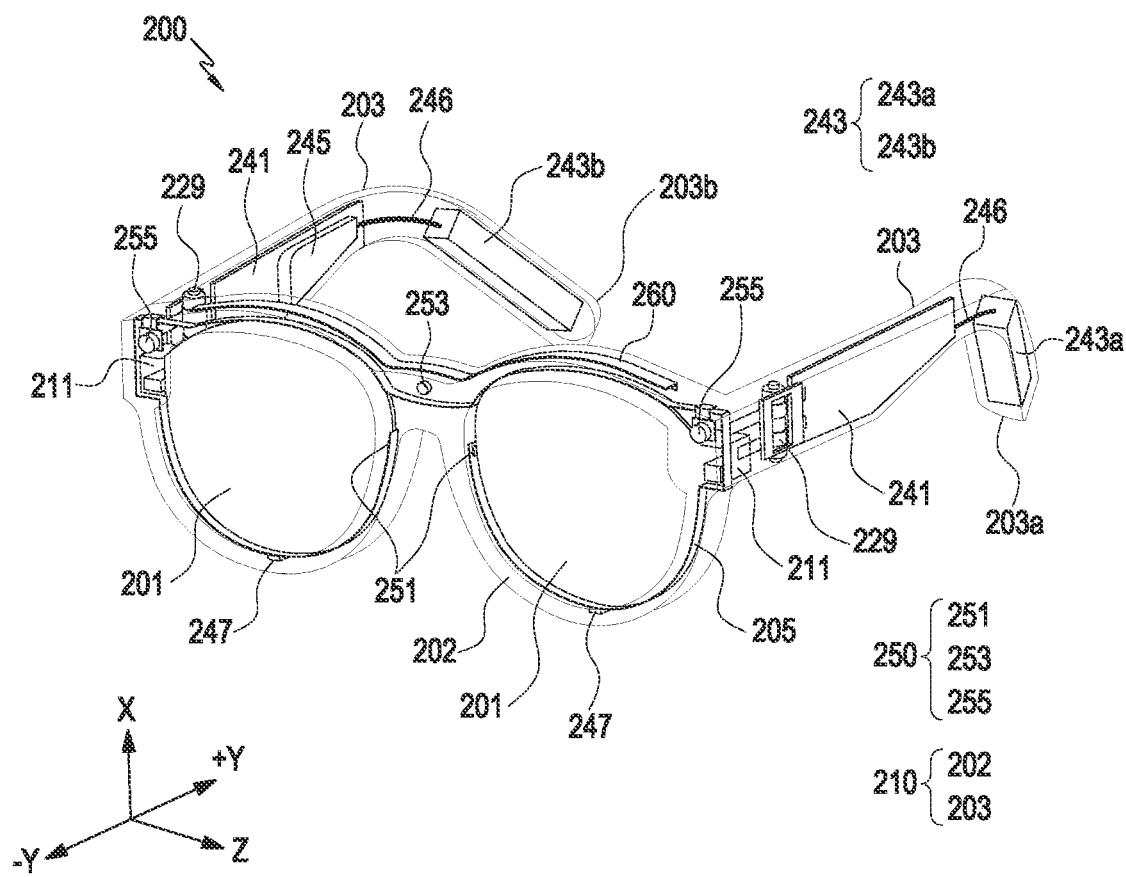
FIG. 3A is a first perspective view illustrating an internal configuration of an electronic device according to an embodiment of the disclosure.

FIG. 3A is a first perspective view illustrating an internal configuration of an electronic device according to an embodiment of the disclosure.

Figure 3B:
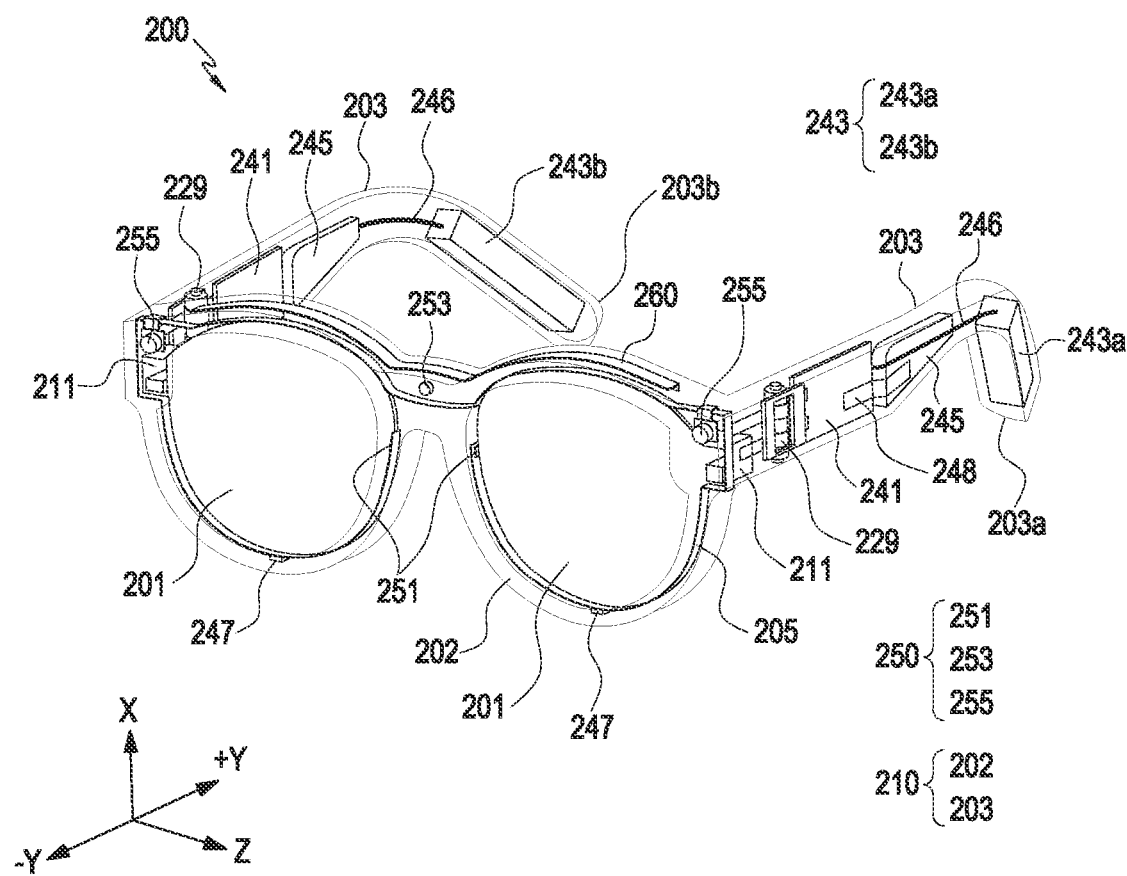
FIG. 3B is a second perspective view illustrating an internal configuration of an electronic device according to an embodiment of the disclosure.

FIG. 3B is a second perspective view illustrating an internal configuration of an electronic device according to an embodiment of the disclosure.

Figure 4:
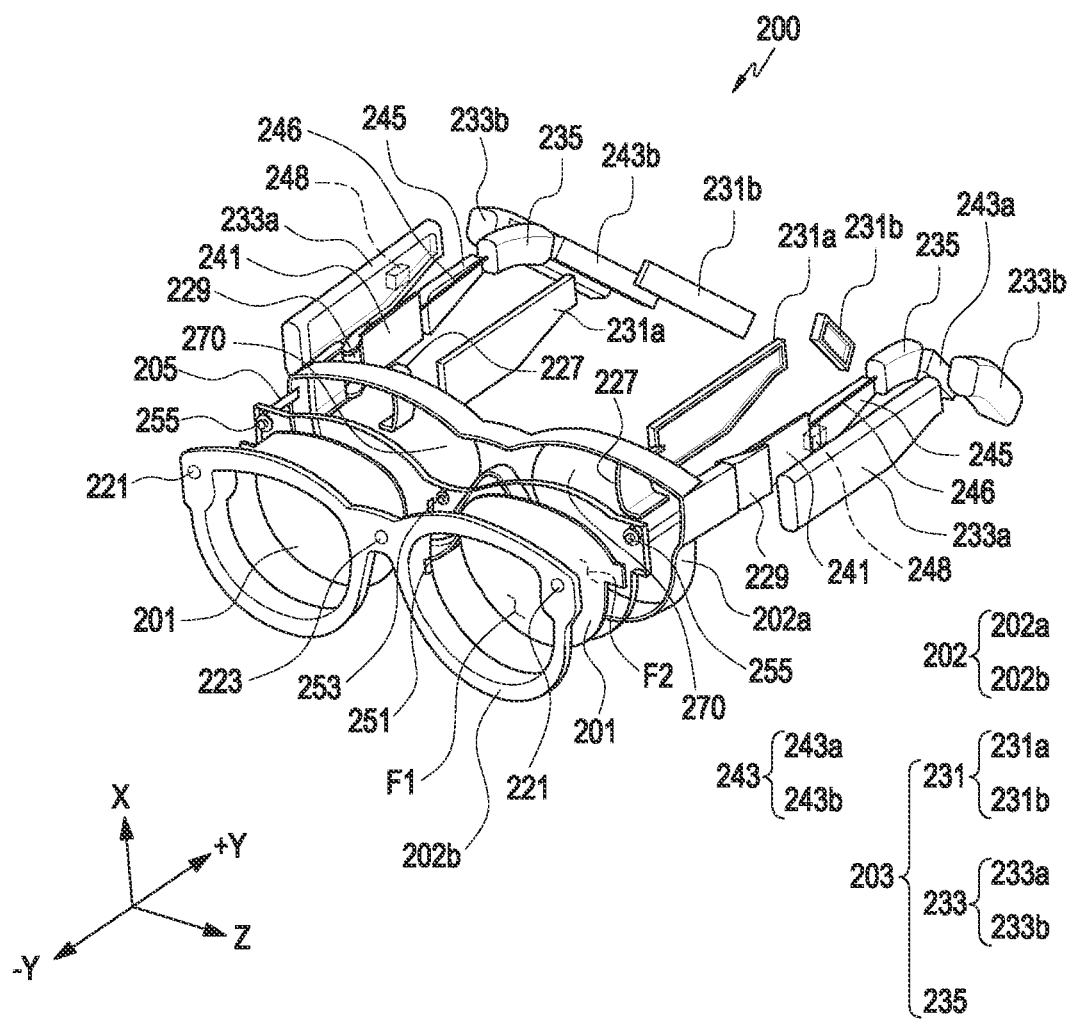
FIG. 4 is an exploded perspective view illustrating an electronic device according to an embodiment of the disclosure.

FIG. 4 is an exploded perspective view of an electronic device according to an embodiment of the disclosure.

Referring to FIGS. 3A, 3B, and 4, the electronic device 200 may include components (e.g., at least one printed circuit board 241 (e.g., a printed circuit board (PCB), a printed board assembly (PBA), a flexible PCB (FPCB), or a rigid-flexible PCB (RFPCB)) received in the housing 210, at least one battery 243, at least one speaker module 245, at least one power transfer structure 246, and a camera module 250. The configuration of the housing 210 in FIGS. 3A and 3B may be entirely or partially identical to the configuration of the display member 201, the lens frame 202, the wearing member 203, and the hinge structure 229 of FIG. 2.

According to an embodiment of the disclosure, the electronic device 200 may acquire and/or recognize a visual image related to an object or environment in a direction the user views or the electronic device 200 is directed (e.g., the −Y direction) by using the camera module 250 (e.g., the camera 116 in FIG. 1) and may be provided with information on the object or environment from an external electronic device (e.g., the external electronic device 121, 122, 123, 124, or 125 in FIG. 1) or the server 100 or 140 through a network (e.g., the network 150 in FIG. 1). In an embodiment of the disclosure, the electronic device 200 may provide the provided information on the object or environment to the user in an audio or visual form. The electronic device 200 may provide the provided information on the object or environment to the user in a visual form by using a display module (e.g., the display 114 in FIG. 1) through the display member 201. For example, as the electronic device 200 realizes the information on the object or environment in a visual form to be combined with a real image of user's surrounding, the electronic device 200 may implement the augmented reality.

According to an embodiment of the disclosure, the display member 201 may include a first surface F1 facing a direction (e.g., the −Y direction) in which light is incident and a second surface F2 facing a direction (e.g., the +Y direction) opposite to the first surface F1. In a state in which the user wears the electronic device 200, light incident through the first surface F1 or a portion of an image may pass through the second surface F2 of the display member 201 disposed to face the right eye and/or the left eye of the user to be incident to the right eye and/or the left eye of the user.

According to an embodiment of the disclosure, the lens frame 202 may include at least two frames. For example, the lens frame 202 may include a first frame 202a and a second frame 202b. According to an embodiment of the disclosure, in case that the user wears the electronic device 200, the first frame 202a may correspond to a frame of a portion facing the face of the user and the second frame 202b may correspond to a portion of the lens frame 202 spaced apart in a direction of the user's gaze with respect to the first frame 202a.

According to an embodiment of the disclosure, a light output module 211 may provide an image and/or moving image to the user. For example, the light output module 211 may include a display panel (not shown) for outputting an image and a lens (not shown) corresponding to the user's eye and guiding the image to the display member 201. For example, the user may acquire an image output from the display panel of the light output module 211 through the lens of the light output module 211. According to an embodiment of the disclosure, the light output module 211 may include a device configured to display various information. For example, the light output module 211 may include at least one of a liquid crystal display (LCD) device, a digital mirror device (DMD), a liquid crystal on silicon (LCoS) device, an organic light emitting diode (OLED), or a micro light emitting diode (micro LED). According to an embodiment of the disclosure, in case that the light output module 211 and/or the display member 201 includes a liquid crystal display device, a digital mirror device, or a liquid crystal on silicon device, the electronic device 200 may include a light source for emitting light to a display area of the light output module 211 and/or the display member 201. According to an embodiment of the disclosure, in case that the light output module 211 and/or the display member 201 includes one of an organic light emitting diode (OLED) or a micro light emitting diode (micro LED), the electronic device 200 may provide a virtual image to the user without including a separate light source.

According to an embodiment of the disclosure, at least a portion of the light output module 211 may be disposed in the housing 210. For example, the light output module 211 may be disposed in the wearing member 203 or the lens frame 202 to corresponding to each of the light eye and the left eye of the user. According to an embodiment of the disclosure, the light output module 211 may be connected to the display member 201 and may provide an image to the user through the display member 201. For example, an image output from the light output module 211 may be incident to the display member 210 through an input optical member located on one end of the display member 201 and may be emitted toward the user's eyes through a waveguide and an output optical member located on at least a portion of the display member 210. According to an embodiment of the disclosure, the waveguide may be formed of glass, plastic, or a polymer, and may include a nanopattern, for example, a grating structure having a polygonal or curved surface shape formed on a surface inside or outside. According to an embodiment of the disclosure, the waveguide may include at least one of a diffraction element (for example, a diffractive element (DOE) and a holographic optical element (HOE)) or a reflection element (for example, a reflective mirror).

According to an embodiment of the disclosure, the printed circuit board 241 may include components for driving the electronic device 200. For example, the printed circuit board 241 may include at least one integrated circuit chip and at least one of the processor 111, the memory 112, or the communication device 117 of FIG. 1 may be provided to the integrated chip. According to an embodiment of the disclosure, the printed circuit board 241 may be disposed inside the wearing member 203 of the housing 210. According to an embodiment of the disclosure, the printed circuit board 241 may be connected to the battery 243 through the power transfer structure 246. According to an embodiment of the disclosure, the printed circuit board 241 may be connected to the flexible printed circuit board 205 and may transfer an electrical signal to electronic components (e.g., the light output module 211, the camera module 250, and a light-emitting part) of the electronic device through the flexible printed circuit board 205. According to an embodiment of the disclosure, the printed circuit board 241 may include an interposer board.

According to various embodiments of the disclosure, the flexible printed circuit board 205 may extend from the printed circuit board 241 to an inside of the lens frame 202 via the hinge structure 229 and may be disposed on at least a portion of a circumference of the display member 201 inside the lens frame 202.

According to an embodiment of the disclosure, the battery 243 may be electrically connected to components (e.g., the light output module 211, the printed circuit board 241, the speaker module 245, the microphone module 247, and/or the camera module 250) of the electronic device 200 and may provide power to the components of the electronic device 200.

According to an embodiment of the disclosure, at least a portion of the battery 243 may be disposed in the wearing member 203. According to an embodiment of the disclosure, the battery 243 may be disposed adjacent to an end portion 203a or 203b of the wearing member 203. For example, the battery 243 may include a first battery 243a disposed at a first end portion 203a of the wearing member 203 and a second battery 243b disposed at a second end portion 203b.

According to various embodiments of the disclosure, the speaker module 245 (e.g., the input/output device 113 in FIG. 1) may convert an electrical signal into a sound. At least a portion of the speaker module 245 may be disposed in the wearing member 203 of the housing 210. According to an embodiment of the disclosure, the speaker module 245 may be disposed inside the wearing member 203 to correspond to the user's ear. According to an embodiment (e.g., FIG. 3A) of the disclosure, the speaker module 245 may be disposed on the printed circuit board 241. For example, the speaker module 245 may be disposed between the printed circuit board 241 and an internal case (e.g., the internal case 231 in FIG. 4). According to an embodiment (e.g., FIG. 3B) of the disclosure, the speaker module 245 may be disposed next to the printed circuit board 241. For example, the speaker module 245 may be disposed between the printed circuit board 241 and the battery 243.

According to an embodiment of the disclosure, the electronic device 200 may include a connection member 248 connected to the speaker module 245 and the printed circuit board 241. The connection member 248 may transfer at least a portion of a sound and/or vibration generated from the speaker module 245 to the printed circuit board 241. According to an embodiment of the disclosure, the connection member 248 may be integrally formed with the speaker module 245. For example, a portion extending from a speaker frame of the speaker module 245 may be interpreted as the connection member 248. According to an embodiment (e.g., FIG. 3A) of the disclosure, the connection member 248 may be omitted. For example, in case that the speaker module 245 is disposed on the printed circuit board 241, the connection member 248 may be omitted.

According to an embodiment of the disclosure, the power transfer structure 246 may transfer power of the battery 243 to an electronic component (e.g., the light output module 211) of the electronic device 200. For example, the power transfer structure 246 may be electrically connected to the battery 243 and/or the printed circuit board 241 and the printed circuit board 241 may transfer the received power to the light output module 211 through the power transfer structure 246.

According to an embodiment of the disclosure, the power transfer structure 246 may include a configuration capable of transferring power. For example, the power transfer structure 246 may include a flexible printed circuit board or a wire. For example, the wire may include multiple cables (not shown). In various embodiments of the disclosure, a form of the power transfer structure 246 may be variously changed according to the number and/or type of cables.

According to an embodiment of the disclosure, the microphone module 247 (e.g., the input/output device 113 in FIG. 1) may convert a sound into an electrical signal. According to an embodiment of the disclosure, the microphone module 247 may be disposed on at least a portion of the lens frame 202. For example, at least one microphone module 247 may be disposed on a lower end (e.g., a direction facing the −X axis) and/or an upper end (e.g., a direction facing the X axis) of the electronic device 200. According to an embodiment of the disclosure, the electronic device 200 may recognize a user's voice more clearly by using voice information (e.g., a sound) acquired by at least one microphone module 247. For example, the electronic device 200 may distinguish voice information and peripheral noise based on the acquired voice information and/or additional information (e.g., a low-frequency vibration of the user's skin and bones). For example, the electronic device 200 may clearly recognize the user's voice and perform a function (e.g., noise canceling) for reducing peripheral noise.

According to an embodiment of the disclosure, the camera module 250 may capture a still image and/or moving image. The camera module 250 may include at least one of a lens, at least one image sensor, an image signal processor, or a flash. According to an embodiment of the disclosure, the camera module 250 may be disposed in the lens frame 202 and around the display member 201.

According to an embodiment of the disclosure, the camera module 250 may include at least one first camera module 251. According to an embodiment of the disclosure, the first camera module 251 may capture the user's eye (e.g., a pupil or iris) or a trajectory of a gaze. For example, the first camera module 251 may capture a reflection pattern of light emitted by the light-emitting part to the user's eye. For example, the light-emitting part may emit light in an infrared band for tracking a trajectory of a gaze by using the first camera module 251. For example, the light-emitting part may include an IR LED. According to an embodiment of the disclosure, a processor (e.g., the processor 111 in FIG. 1) may adjust a location of a virtual image so that the virtual image projected to the display member 201 corresponds to a direction in which the user's eye gazes. According to an embodiment of the disclosure, the first camera module 251 may include a global shutter (GS) type camera and the user's eye and a trajectory of a gaze may be tracked by using a plurality of first camera modules 251 having the same specifications and performance.

According to various embodiments of the disclosure, the first camera module 251 may periodically or aperiodically transmit information (e.g., trajectory information) on tracking of the user's eye and the trajectory of a gaze to the processor (e.g., the processor 111 in FIG. 1). According to an embodiment of the disclosure, when detecting that the user's gaze is changed (e.g., moving more than a reference value in a state in which the head does not move) based on the trajectory information, the first camera module 251 may transmit the trajectory information to the processor.

According to an embodiment of the disclosure, the camera module 250 may include a second camera module 253. According to an embodiment of the disclosure, the second camera module 253 may capture an external image. According to an embodiment of the disclosure, the second camera module 253 may include a global shutter type or rolling shutter (RSO type camera). According to an embodiment of the disclosure, the second camera module 253 may capture an external image through a second optical hole 223 formed through the second frame 202*b*. For example, the second camera module 253 may include a high-resolution color camera and may correspond to a high resolution (HR) or photo video (PV) camera. Furthermore, the second camera module 253 may provide an auto focus (AF) function and an image stabilization function (optical image stabilizer (OIS)).

According to various embodiments (not shown) of the disclosure, the electronic device 200 may include a flash (not shown) located adjacent to the second camera module 253. For example, the flash (not shown) may provide light for increase brightness (e.g., illuminance) of a periphery of the electronic device 200 when the second camera module 253 acquires an external image and may reduce image acquisition difficulties due to dark environments, incorporation of various light sources, and/or reflections of light.

According to an embodiment of the disclosure, the camera module 250 may include at least one third camera module 255. According to an embodiment of the disclosure, the third camera module 255 may capture a motion of the user through a first optical hole 221 formed through the lens frame 202. For example, the third camera module 255 may capture a user's gesture (e.g., a hand motion). The third camera module 255 and/or the first optical hole 221 may be disposed at opposite side ends of the lens frame 202 (e.g., the second frame 202*b*), for example, at opposite ends of the lens frame 202 (e.g., the second frame 202*b*) in the X direction, respectively. According to an embodiment of the disclosure, the third camera module 255 may include a global shutter type camera. For example, the third camera module 255 may correspond to a camera for supporting 3 degrees of freedom (DoF) or 6 DoF and may 360-degree space (e.g., omnidirectional) location recognition, and/or movement recognition. According to an embodiment of the disclosure, the third camera module 255 may perform a moving path tracking function (simultaneous localization and mapping (SLAM)) and a user's movement recognition function by using a plurality of global shutter type cameras as stereo cameras having the same specifications and performance. According to an embodiment of the disclosure, the third camera module 255 may include an infrared (IR) camera (e.g., a time of flight (TOF) camera or structured light camera). For example, the IR camera may operate as at least a portion of a sensor module (e.g., the sensor device 115 in FIG. 1) for detecting a distance to an object.

According to an embodiment of the disclosure, at least one of the first camera module 251 or the third camera module 255 may be replaced with a sensor module (e.g., the sensor device 115 in FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to an embodiment of the disclosure, at least one of the first camera module 251, the second camera module 253, or the third camera module 255 may include a plurality of camera modules (not shown). For example, the second camera module 253 may include a plurality of lenses (e.g., wide-angle and telephoto lenses) and image sensors and may be disposed on a surface (e.g., a surface facing the −Y axis) of the electronic device 200. For example, the electronic device 200 may include a plurality of camera modules having different properties (e.g., an angle of view) or functions and control to change angles of view of camera modules based on a user's selection and/or trajectory information. For example, at least one of the plurality of camera modules may be a wide-angle camera and at least another camera may be a telephoto camera.

According to various embodiments of the disclosure, the processor (e.g., the processor 111 in FIG. 1) may determine movement of the electronic device 200 and/or movement of the user based on information of the electronic device 200 acquired by using at least one of a gesture sensor, a gyro sensor, or an acceleration sensor of the sensor module (e.g., the sensor device 115 in FIG. 1) and an operation (e.g., approach of the user to the electronic device 200) of the user acquired by using the third camera module 255. According to an embodiment of the disclosure, in addition to the sensors described above, the electronic device 200 may include a magnetic (geomagnetic) sensor that may measure a direction using a magnetic field and magnetic line of force, and/or a Hall sensor that may acquires movement information (e.g., a movement direction or movement distance) using a strength of a magnetic field. For example, the processor may determine movement of the electronic device 200 and/or movement of the user based on information acquired from a magnetic (geomagnetic) sensor and/or a Hall sensor.

According to various embodiments (not shown) of the disclosure, the electronic device 200 may perform an input function (e.g., a touch and/or pressure detection function) which allows interaction with the user. For example, a component (e.g., a touch sensor and/or pressure sensor) configured to perform a touch and/or pressure detection function may be disposed on at least a portion of the wearing member 203. The electronic device 200 may control a virtual image output through the display member 201 based on information acquired through the component. For example, a sensor related to the touch and/or pressure detection function may be configured in various types, such as a resistive type, a capacitive type, an electro-magnetic (EM) type, or an optical type. According to an embodiment of the disclosure, the component configured to perform the touch and/or pressure detection function may be entirely or partially identical to the input/output device 113 in FIG. 1.

According to an embodiment of the disclosure, the electronic device 200 may be disposed in an internal space of the lens frame 202 and may include a reinforcement member 260 formed to have a rigidity higher than that of the lens frame 202.

According to an embodiment of the disclosure, the electronic device 200 may include a lens structure 270. The lens structure 270 may refract at least a portion of light. For example, the lens structure 270 may correspond to a prescription lens having designated refractive power. According to an embodiment of the disclosure, the housing 210 may include a hinge cover 227 for covering a portion of the hinge structure 229. Another portion of the hinge structure 229 may be received or covered between an internal case 231 and an external case 233 to be described below.

According to various embodiments of the disclosure, the wearing member 203 may include the internal case 231 and the external case 233. The internal case 231 may correspond to a case configured to, for example, face the user's body or directly contact the user's body and may be manufactured of a material having a low heat conductivity, for example, a synthetic resin. According to an embodiment of the disclosure, the internal case 231 may include an internal surface (e.g., the internal surface 231*c* in FIG. 2) facing the user's body. The external case 233 may include, for example, a material (e.g., a metallic material) capable of at least partially transferring heat and may be coupled to face the internal case 231. According to an embodiment of the disclosure, the external case 233 may include an external surface (e.g., the external surface 231*d* in FIG. 2) opposite to the internal surface 231*c*. In an embodiment of the disclosure, at least one of the printed circuit board 241 or the speaker module 245 may be received in a space separated from the battery 243 inside the wearing member 203. In the described embodiment of the disclosure, the internal case 231 may include a first case 231*a* including the printed circuit board 241 and/or the speaker module 245 and a second case 231*b* for receiving the battery 243, and the external case 233 may include a third case 233*a* coupled to face the first case 231*a* and a fourth case 233*b* coupled to face the second case 231*b*. For example, the first case 231*a* and the third case 233*a* may be coupled (hereinafter, a "first case part 231*a* and 233*a*") to receive the printed circuit board 241 and/or the speaker module 245, and the second case 231*b* and the fourth case 233*b* may be coupled (hereinafter, a "second case part 231*b* and 233*b*") to receive the battery 243.

According to an embodiment of the disclosure, the first case part 231*a* and 233*a* may be rotatably coupled to the lens frame 202 through the hinge structure 229, and the second case part 231*b* and 233*b* may be connected or mounted to an end portion of the first case part 231*a* and 233*a* through the connection structure 235. In some embodiments of the disclosure, a portion of the connection structure 235, which comes in contact with the user's body, may be manufactured of a material having a low heat conductivity, for example, an elastic material, such as silicone or polyurethane, and a portion not in contact with the user's body may be manufacture of a material (e.g., a metallic material) having a high conductivity. For example, in case that heat is generated from the printed circuit board 241 or the battery 243, the connection structure 235 may block the heat from being transferred to the portion coming in contact with the user's body and disperse or dissipate the heat through the portion not in contact with the user's body. According to an embodiment of the disclosure, the portion of the connection structure 235, which is configured to come in contact with the user's body, may be interpreted as a portion of the internal case 231, and the portion of the connection structure 235, which is not in contact with the user's body may be interpreted as a portion of the external case 233. According to an embodiment (not shown) of the disclosure, the first case 231*a* and the second case 231*b* may be integrally formed without the connection structure 235, and the third case 233*a* and the fourth case 233*b* may be integrally formed without the connection structure 235. According to various embodiments of the disclosure, other components (e.g., an antenna module) may be further included in addition to the aforementioned components, and information on the object or environment may be provided from an external electronic device (e.g., the external electronic device 121, 122, 123, 124, and 125 or the server 100 or 140 in FIG. 1) through the network (e.g., the network 150 in FIG. 1) by using the communication module 190.

Figure 5A:
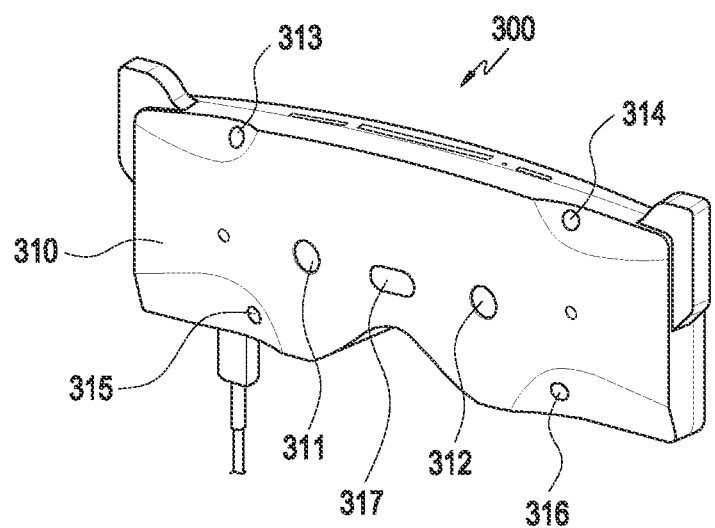
FIGS. 5A and 5B are views illustrating a front surface and a rear surface of an electronic device according to various embodiments of the disclosure.
Figure 5B:
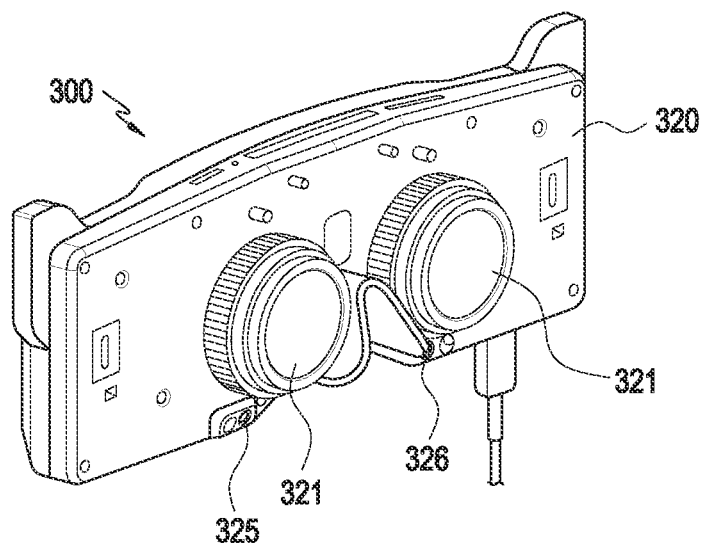

FIGS. 5A and 5B are views illustrating a front surface and a rear surface of a wearable electronic device 300 according to various embodiments of the disclosure.

Referring to FIGS. 5A and 5B, in an embodiment of the disclosure, camera modules 311, 312, 313, 314, 315, and 316 for acquiring information related to the surrounding environment of the wearable electronic device 300 and/or a depth sensor 317 may be arranged on a first surface 310 of a housing.

In an embodiment of the disclosure, camera modules 311 and 312 may acquire an image related to the surrounding environment of the wearable electronic device.

In an embodiment of the disclosure, camera modules 313, 314, 315, and 316 may acquire an image in a state in which the user wears the wearable electronic device. The camera modules 313, 314, 315, and 316 may be used for hand detection, tracking, and user's gesture (e.g., a hand motion) recognition. The camera modules 313, 314, 315, and 316 may be used for head tracking of 3 DoF and 6 DoF, location (space or environment) recognition, and/or movement recognition. In an embodiment of the disclosure, camera modules 311 and 312 may be used for hand detection, tracking, and user's gesture.

In an embodiment of the disclosure, the depth sensor 317 may be configured to transmit a signal and receive a signal reflected from an object and may be used for identifying a distance to an object like time of flight (TOF).

According to an embodiment of the disclosure, a camera module 325 or 326 for recognizing a face and a display 321 (and/or a lens) may be arranged on a second surface 320 of the housing.

In an embodiment of the disclosure, the camera module 325 or 326 for recognizing a face adjacent to the display may be used for recognizing the user's face or recognizing and/or tracking the user's both eyes.

In an embodiment of the disclosure, the display 321 (and/or a lens) may be disposed on the second surface 320 of the wearable electronic device 300. In an embodiment of the disclosure, the wearable electronic device 300 may not include camera modules 315 and 316 among the plurality of camera modules 313, 314, 315, and 316. Although not described in FIGS. 5A and 5B, the electronic device 300 may further include at least one component among components shown in FIG. 2.

As described above, the wearable electronic device 300 according to an embodiment may have a form factor to be mounted on the user's head. The wearable electronic device 300 may further include a wearing member and/or a strip for fixation on the user's body part. Within a state worn on the user's head, the wearable electronic device 300 may provide a user experience based on an augmented reality, a virtual reality, and/or a mixed reality.

Figure 6:
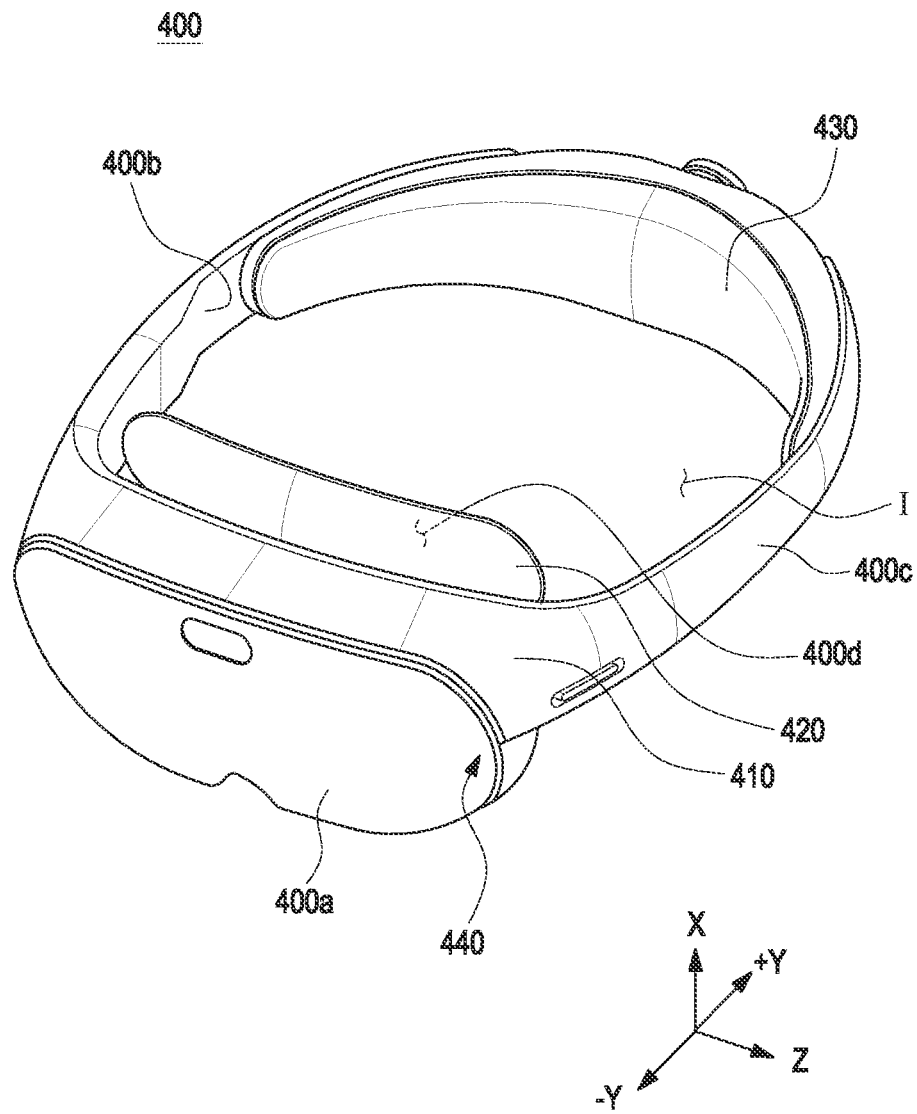
FIG. 6 illustrates perspective view of an electronic device according to an embodiment of the disclosure.

FIG. 6 is a perspective view illustrating an electronic device according to various embodiments of the disclosure.

Referring to FIG. 6, an electronic device 400 may be a head mounting device (HMD) capable of providing an image in front of the user's eyes. The configuration of the electronic device 400 of FIG. 6 may be identical in whole or part to the configuration of the electronic device 200 of FIG. 2.

According to an embodiment of the disclosure, the electronic device 400 may form the exterior of the electronic device 400 and may include housings 410, 420, and 430 that may provide a space in which components of the electronic device 400 may be disposed.

According to an embodiment of the disclosure, the electronic device 400 may include a first housing 410 that may surround at least a portion of the user's head. According to an embodiment of the disclosure, the first housing 410 may include a first surface 400*a* facing the outside (e.g., negative Y direction) of the electronic device 400.

According to an embodiment of the disclosure, the first housing 410 may surround at least a portion of the inner space I. For example, the first housing 410 may include a second surface 400*b* facing the inner space I of the electronic device 400 and a third surface 400*c* opposite to the second surface 400*b*. According to an embodiment of the disclosure, the first housing 410 may be coupled with the third housing 430 and may be formed in a closed loop shape surrounding the inner space I.

According to an embodiment of the disclosure, the first housing 410 may surround at least some of the components of the electronic device 400. For example, the light output module (e.g., the light output module 211 of FIG. 3), the circuit board (e.g., the circuit board 241 of FIG. 3), and the speaker module 245 may be disposed in the first housing 410.

According to an embodiment of the disclosure, the electronic device 400 may include one display member 440 corresponding to the left eye and the right eye. The display member 440 may be disposed in the first housing 410. The configuration of the display member 440 of FIG. 6 may be identical in whole or part to the configuration of the display member 201 of FIG. 2.

According to an embodiment of the disclosure, the electronic device 400 may include a second housing 420 that may be seated on the user's face. According to an embodiment of the disclosure, the second housing 420 may include a fourth surface 400*d* that may at least partially face the user's face. According to an embodiment of the disclosure, the fourth surface 400*d* may be a surface in a direction (e.g., positive Y direction) toward the internal space I of the electronic device 400. According to an embodiment of the disclosure, the second housing 420 may be coupled with the first housing 410.

According to an embodiment of the disclosure, the electronic device 400 may include a third housing 430 that may be seated on the back of the user's head. According to an embodiment of the disclosure, the third housing 430 may be coupled with the first housing 410. According to an embodiment of the disclosure, the third housing 430 may surround at least some of the components of the electronic device 400. For example, a battery (e.g., the battery 243 of FIG. 3) may be disposed in the third housing 430.

Figure 7:
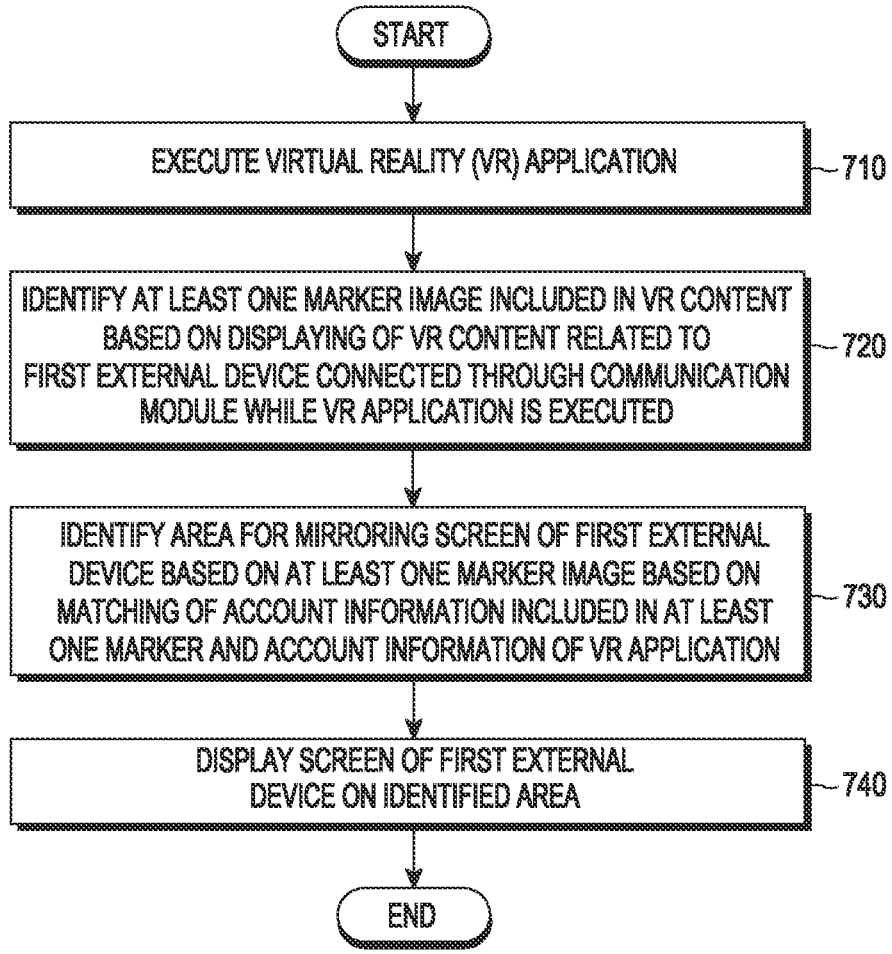
FIG. 7 is a flowchart illustrating an operation in which an electronic device uses an external device connected to an electronic device in a virtual reality according to an embodiment of the disclosure.

FIG. 7 is a flowchart illustrating an operation in which an electronic device uses an external device connected to the electronic device in a virtual reality according to an embodiment of the disclosure.

Referring to FIG. 7, in operation 710, an electronic device (e.g., the electronic device 110 in FIG. 1, the processor 111 in FIG. 1, the electronic device 200 in FIG. 2, 3A, 3B, or 4, the electronic device 300 in FIG. 5A or 5B, or the electronic device 400 in FIG. 6) may execute a virtual reality (VR) application. According to an embodiment of the disclosure, the electronic device may correspond to a wearable device, such as VR glasses, AR glasses, an HMD device. According to an embodiment of the disclosure, the electronic device may include a laptop, a tablet, and a personal computer (PC).

According to an embodiment of the disclosure, the VR application may include a game application and an image application which may provide a VR content expressed in a virtual space of a virtual reality environment (also, referred to as a "virtual world"). However, the VR application is not limited to the game application and the image application described above.

According to an embodiment of the disclosure, in operation 720, based on displaying a VR content related to a first external device (e.g., the external device 121, 122, 123, 124, and 125 in FIG. 1) connected through a communication module (e.g., the communication device 117 in FIG. 1) while the VR application is executing, the electronic device may identify at least one marker image included in the VR application.

According to an embodiment of the disclosure, the VR content may include a content which may express a scene from a view point of an avatar (or character) (hereinafter, the avatar corresponding to the user will be referred to as an "avatar corresponding to the user" or an "avatar") corresponding to the user in the virtual space. For example, the VR content may include a content capable of expressing a scene from a first person point of view corresponding to a direction (or the user's gaze) the electronic device 110 is directed. According to an embodiment of the disclosure, the scene from the first person point of view may not include the avatar corresponding to the user or may include a body part (e.g., a hand of the avatar) of the avatar or an item the avatar is wearing.

According to an embodiment of the disclosure, the first external device may be an electronic device which may be used in conjunction with the electronic device. For example, the first external device may include a mobile device, such as a smartphone, a smart watch, and a tablet or may include a PC.

According to an embodiment of the disclosure, the first external device may be registered to a server (e.g., the server 100 in FIG. 1) in association with an account of the VR application through the first external device. According to an embodiment of the disclosure, an operation of registering the first external device will be described with reference to FIGS. 8, 9, 10A, and 10B.

According to an embodiment of the disclosure, the VR content may be generated from the server based on an external shape of the first external device and displayed on an execution screen of the VR application provided by the server.

According to an embodiment of the disclosure, in case that an account registration request is performed through the first external device, the server may acquire device information on the first external device from a database in which information for each device is stored based on the information on the first external device. For example, the device information may include an external shape information of a device, resolution information of a display included in a device, and/or an image size.

According to an embodiment of the disclosure, the server may generate a VR content based on the external shape information of the first external device.

According to an embodiment of the disclosure, an operation of generating a VR content based on the external shape information of the first external device will be described with reference to FIG. 9.

According to an embodiment of the disclosure, the marker image may be generated from the server in association with the first external device and the account, based on the registration of the first external device to the server and included in an execution screen of the VR application provided by the server.

According to an embodiment of the disclosure, in case that the first external device registers the account to the server, the server may generate the marker image based on the external shape information and the account information of the first external device. According to an embodiment of the disclosure, the marker image may include the account information and/or screen size information of the first external device. According to an embodiment of the disclosure, the marker image may include a checker, a barcode and/or a quick response (QR) code.

According to an embodiment of the disclosure, a virtual environment of a virtual reality application may be generated through a creator tool. According to an embodiment of the disclosure, a manager of the virtual reality application may display a VR content for each external device generated by the server on the virtual reality application through the creator tool and include and/or display the marker image generated based on the account information registered to the server to or on the VR content displayed on the virtual reality application.

According to an embodiment of the disclosure, an operation of generating the marker image by the server will be described below with reference to FIGS. 8, 10A, 10B, and 11.

According to an embodiment of the disclosure, the electronic device may display, based on matching of the account information of the VR application and account information included in a marker image among a plurality of marker images included in an execution screen of the VR application, a screen of the first external device by replacing the marker image.

According to an embodiment of the disclosure, the electronic device may display, based on non-matching of the account information of the VR application and account information included in a marker image among the plurality of marker images, the marker image. For example, the marker image displayed on the execution screen of the VR application may be a marker image of another person, which is an account different from the account logged in through the electronic device.

According to an embodiment of the disclosure, an embodiment in which the marker image is displayed on the execution screen of the VR application will be described with reference to FIG. 12.

According to an embodiment of the disclosure, in operation 730, the electronic device may identify an area for mirroring a screen of the first external device based on at least one marker image based on matching of account information included in the at least one marker image and account information of the VR application.

According to an embodiment of the disclosure, the electronic device may search the marker image included in the execution screen of the VR application. According to an embodiment of the disclosure, in case that the marker image included in the execution screen of the VR application is searched, the electronic device may identify whether the account information included in the marker image matches the account information logged into the VR application.

According to an embodiment of the disclosure, in case that the account information matches, the electronic device may identify an area for mirroring a screen of the first external device based on the marker image. According to an embodiment of the disclosure, in case that two marker images are diagonally arranged to correspond to a size of a display of the first external device on the VR content, the electronic device may identify an area for mirroring a screen of the first external device based on locations of the two marker images. According to an embodiment of the disclosure, in case that one marker image is disposed on the VR content, an area for mirroring a screen of the first external device may be identified based on display size information, location information, and/or shape information of the first external device included in the marker image.

According to an embodiment of the disclosure, in operation 740, the electronic device may display the screen of the first external device on the area.

According to an embodiment of the disclosure, the electronic device may receive screen information on the screen displayed on the display of the first external device from the first external device. According to an embodiment of the disclosure, the electronic device may display a screen corresponding to the screen of the first external device on the area identified based on the received screen information.

According to an embodiment of the disclosure, the VR content may be disposed on a body part of a virtual person (e.g., an avatar) corresponding to the account (e.g., a logged-in account) and displaying thereof may be determined based on an action of the virtual person. For example, in case that the execution screen of the VR application is the avatar's first-person view, the VR content may be displayed when the user intentionally looks at a portion of the avatar on which the VR content is disposed. For example, in case that a VR content corresponding to a smart watch is disposed on a wrist of the avatar, the VR content may be displayed when looking at a screen of the VR content by raising an avatar's hand.

According to an embodiment of the disclosure, the VR content may be displayed a partial area of the display of the electronic device regardless of the virtual person corresponding to the account. According to an embodiment of the disclosure, in case that the VR content is displayed regardless of the virtual person, the VR content may be overlaid and displayed on a portion of the execution screen of the virtual reality application, such as being displayed at a higher layer than the execution screen of the virtual reality application even if a location of the execution screen of the virtual reality application is changed or an action of the virtual person changes.

According to an embodiment of the disclosure, an operation of mirroring the screen of the first external device will be described below with reference to FIGS. 13, 14A, 14B, 15A, and 15B.

As such, in case that the VR content is displayed regardless of the virtual person, the electronic device may provide the screen of the first external device and receive a control command even if the user performs any operation to use the first external device. According to an embodiment of the disclosure, an embodiment in which the VR content is displayed regardless of the virtual person will be described below with reference to FIG. 16.

According to an embodiment of the disclosure, the electronic device may transmit, based on a user input received on a screen of the first external device displayed on the area, control information for controlling the first external device to the first external device.

According to an embodiment of the disclosure, the electronic device may acquire, based on coordinate information of the area on which a screen of the first external device is displayed, coordinate information of the user input related to a location of the user input (e.g., gesture and gaze tracking) within the screen of the first external device.

According to an embodiment of the disclosure, the electronic device may identify a location and/or a type of the user input through a deep learning algorithm. For example, the electronic device may identify whether the user input is a touch input, a double-tab input, and/or a drag operation through a deep learning algorithm.

According to an embodiment of the disclosure, the electronic device may transmit the coordinate information of the user input and information on a type of the user input to the first external device.

According to an embodiment of the disclosure, an operation of receiving the user input on the mirrored screen of the first external device and transmitting control information to the first external device based on the user input will be described below with reference to FIGS. 17A, 17B, and 18.

According to an embodiment of the disclosure, the electronic device may replace a first screen with a second screen in a state of displaying the first screen of the first external device, based on reception of screen information on the second screen different from the first screen from the first external device.

According to an embodiment of the disclosure, in case that a screen of the first external device is changed based on occurrence of an event in the first external device, the electronic device may receive screen information on the changed screen from the first external device. According to an embodiment of the disclosure, the electronic device may replace a screen of the first external device displayed on the execution screen of the virtual reality application with the changed screen. As such, the screen of the first external device may be displayed on the execution screen of the virtual reality application in real time.

According to an embodiment of the disclosure, the electronic device may further include a microphone (e.g., the input/output device 113 in FIG. 1).

According to an embodiment of the disclosure, the electronic device may activate the microphone based on a request received from the first external device. According to an embodiment of the disclosure, in case that an event requiring a voice input, such as call reception occurs, the first external device may transmit a request for activating the microphone to the electronic device.

According to an embodiment of the disclosure, in case that a voice input is required, the electronic device may activate the microphone. For example, in case that a wake-up voice (e.g., Hi, Bixby) for controlling the first external device with a voice is received or a gesture input and/or gaze tracking for inputting a voice is received through the execution screen of the virtual reality application, the electronic device may active the microphone.

According to an embodiment of the disclosure, the electronic device may transmit the voice acquired through the activated microphone to the first external device.

According to an embodiment of the disclosure, the first external device may process the voice received from the electronic device through an application (e.g., a phone application) in which an event occurs. According to an embodiment of the disclosure, the first external device may transmit a sound signal generated through an application to the electronic device. According to an embodiment of the disclosure, the electronic device may output the sound signal received from the first external device through a speaker (e.g., the input/output device 113 in FIG. 1).

According to an embodiment of the disclosure, an operation of controlling the first external device through a voice input of the user based on event occurrence of the first external device will be described below with reference to FIG. 19.

According to an embodiment of the disclosure, the electronic device may be connected to a plurality of external devices. According to an embodiment of the disclosure, the electronic device may display a second VR content related to a second external device connected through the communication module. According to an embodiment of the disclosure, the electronic device may identify, based on identification of at least one second marker image included in the second VR content, a second area for mirroring a screen of the second external device. According to an embodiment of the disclosure, the electronic device may display the screen of the second external device on the second area. For example, in case that the electronic device is connected to the first external device corresponding to a smartphone and the second external device corresponding to a smart watch, and both external devices are registered as the same account to a metaverse generated by the virtual reality application, the electronic device may respectively display a VR content and a mirroring screen corresponding to the two external devices on the execution screen (e.g., the metaverse) of the virtual reality application.

Figure 8:
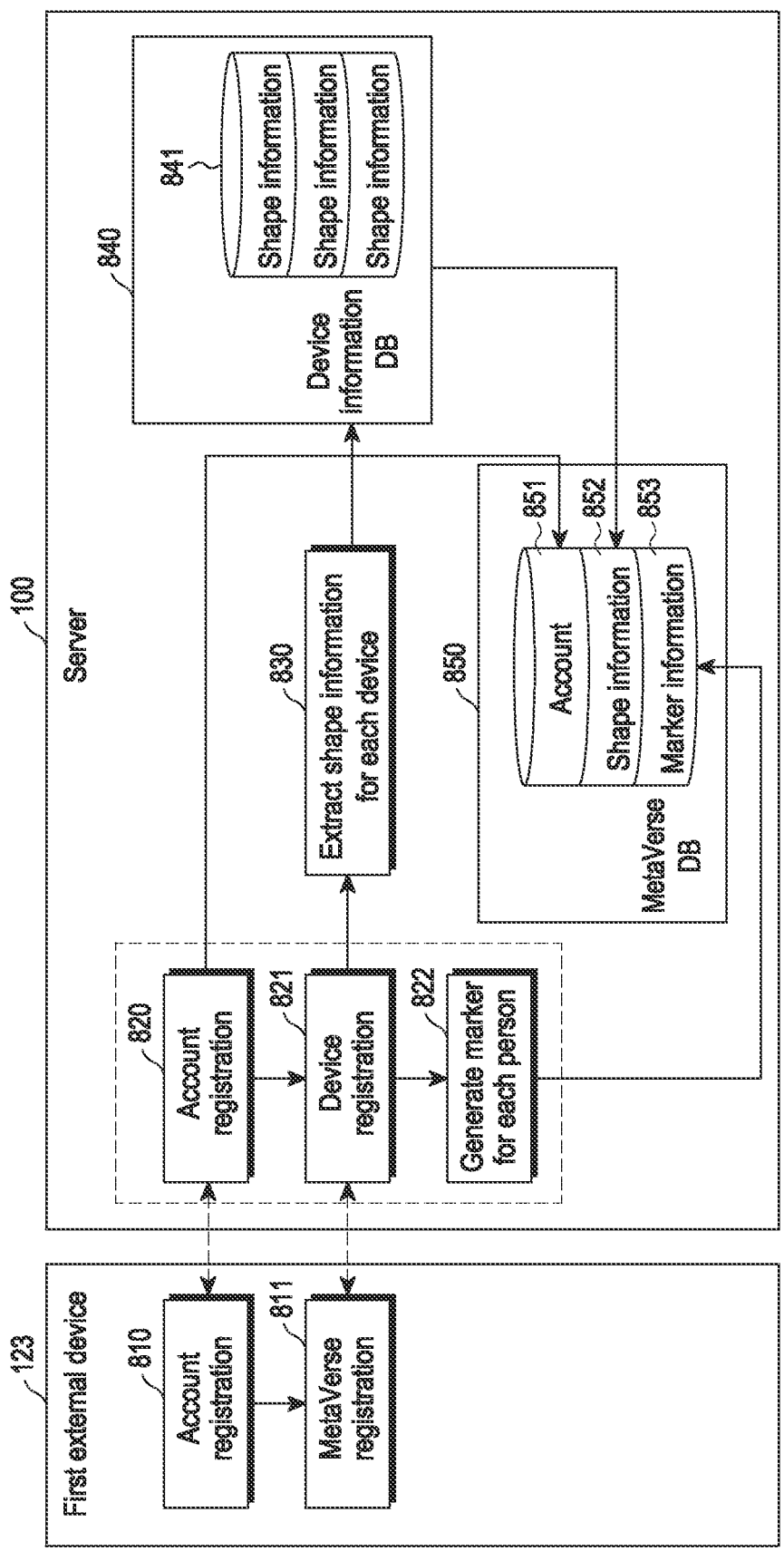
FIG. 8 is a view illustrating an operation of registering an external device connected to an electronic device to a server according to an embodiment of the disclosure.

FIG. 8 is a view illustrating an operation of registering an external device connected to an electronic device to a server according to an embodiment of the disclosure.

Referring to FIG. 8, a first external device 123 (e.g., a smartphone) (e.g., the external electronic device 121, 122, 123, 124, and 125 in FIG. 1) may perform account registration to a server 100 (e.g., the server 100 in FIG. 1) in operation 810. According to an embodiment of the disclosure, an operation of registering the first external device 123 as an account to the server 100 will be described below with reference to FIGS. 10A and 10B.

According to an embodiment of the disclosure, the server 100 may include a communication module (e.g., the communication module 107 in FIG. 1), a memory (e.g., the memory 1 102 in FIG. 1), and at least one processor (e.g., the processor 101 in FIG. 1) operatively connected to the communication module and the memory.

According to an embodiment of the disclosure, in case that an account registration request for a VR application is received from an external device 123 through the communication module, the server 100 may acquire external shape information corresponding to the external device 123 from among a plurality of pieces of external shape information of electronic devices stored in the memory (e.g., a device information database 840).

According to an embodiment of the disclosure, the server 100 may generate a marker image based on the account of which registration has been requested and the external shape information of the external device 123.

According to an embodiment of the disclosure, the server 100 may transmit an execution screen of the VR application including the marker image to a wearable electronic device connected through the communication module.

An operation of the server 100 for registering the external device 123 as described above will be described below.

According to an embodiment of the disclosure, in operation 820, in case that information and a request for account registration is received from the first external device 123, the server 100 may register the account. For example, the server 100 may store the account information received from the first external device 123 in a metaverse database (DB) 850. According to an embodiment of the disclosure, the server 100 may store the account information registered in operation 820 in the metaverse database 850 as account 851 information for displaying the VR content.

According to an embodiment of the disclosure, in operation 811, the first external device 123 may register the first external device 123 to a metaverse. According to an embodiment of the disclosure, the first external device 123 may request registration by transmitting device information to the server 100 so that the first external device 123 may be used in the virtual reality application. According to an embodiment of the disclosure, the device information may include, without limitation, an identifier and/or product name of the first external device 123.

According to an embodiment of the disclosure, in operation 821, in case that a metaverse registration request is received from the first external device 123, the server 100 may perform device registration. According to an embodiment of the disclosure, the server 100 may store the device information on the first external device 123. According to an embodiment of the disclosure, in operation 830, the server 100 may extract shape information (or external shape information) for each device based on the device information of the first external device 123.

According to an embodiment of the disclosure, the server 100 may receive information related to a shape of the first external device 123 from an external server (e.g., the external server 140 in FIG. 1) (e.g., an Internet browser and a manufacturer server) and extract shape information of the first external device 123. According to an embodiment of the disclosure, an operation of extracting shape information of the first external device 123 will be described below with reference to FIG. 9.

According to an embodiment of the disclosure, the server 100 may store the shape information for each device extracted in operation 830 in the device information database (DB) 840. The device information database 840 may store shape information 841 for each external device connectible to the electronic device.

According to an embodiment of the disclosure, the server 100 may store, as shape information 852 for displaying the VR content in the metaverse database 850, shape information corresponding to the first external device 123 among shape information 841 of a plurality of devices stored in the device information database 840.

According to an embodiment of the disclosure, in operation 822, the server 100 may generate a marker (or marker image) for each person based on the information of the first external device 123 and the account information. According to an embodiment of the disclosure, the server 100 may generate one or more markers including the account information and information on a size, location, and/or shape of a display of the first external device 123.

According to an embodiment of the disclosure, the server 100 may store the marker (or marker image) generated in operation 822 as marker information 853 for displaying the VR content in the metaverse database 850.

Figure 9:
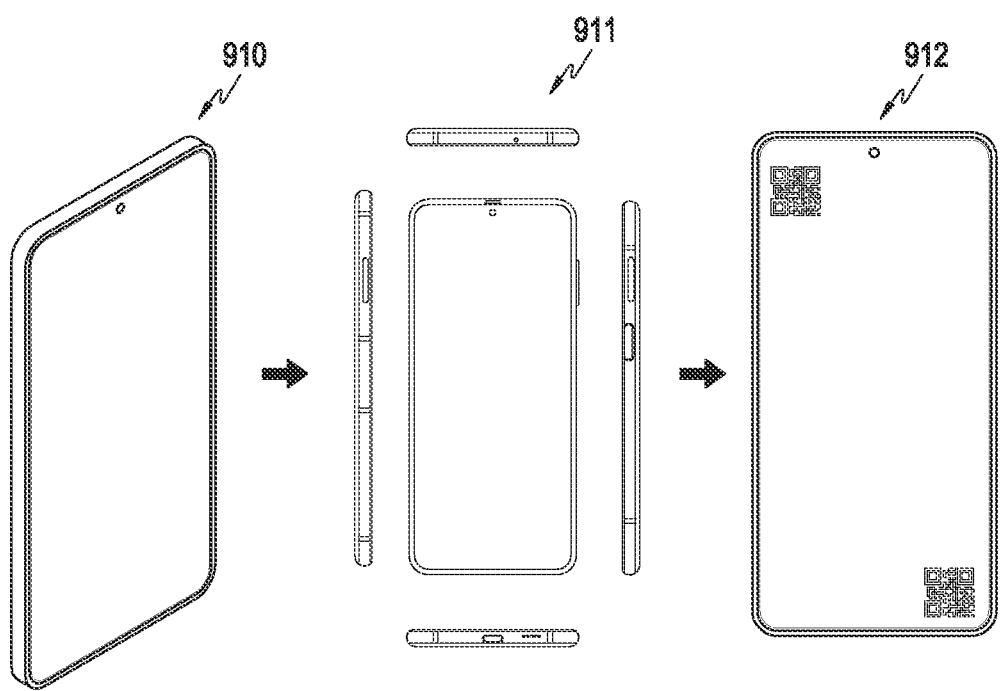
FIG. 9 is a view illustrating an operation of external shape information of an external device according to an embodiment of the disclosure.

FIG. 9 is a view illustrating an operation of external shape information of an external device according to an embodiment of the disclosure.

Referring to FIG. 9, in case that a registration request of a first external device 910 (e.g., a smartphone) (e.g., the external device 121, 122, 123, 124, and 125 in FIG. 1) is received, a server (e.g., the server 100 in FIG. 1) may acquire information 911 related to a shape of the first external device 910 from an external server (e.g., the external server 140 in FIG. 1). For example, the server 100 may receive image information and/or size information on a front surface, a rear surface, both lateral surfaces, an upper surface, and/or a lower surface of the external device 910 from the external server.

According to an embodiment of the disclosure, the server may generate a VR content 912 corresponding to the first external device 910 based on the information 911 related to the shape of the first external device 910.

According to an embodiment of the disclosure, in the metaverse, at least one marker image generated based on device information of the first external device 910 and account information on the VR content 912 corresponding to the first external device 910.

As such, as the VR content 912 is generated based on the external shape information 911 of the first external device 910, the electronic device may provide a user experience as if a real device were used in the metaverse.

Figure 10A:
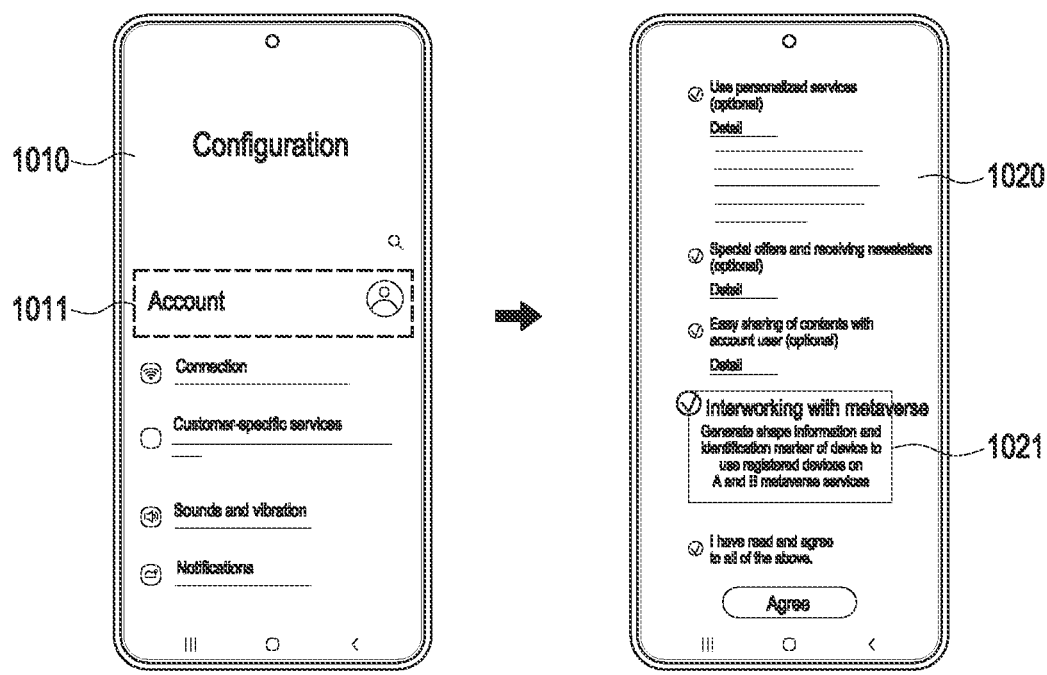
FIG. 10A is a view illustrating a user interface displayed when registering an external device according to an embodiment of the disclosure.

FIG. 10A is a view illustrating a user interface displayed when registering an external device according to an embodiment of the disclosure.

Figure 10B:
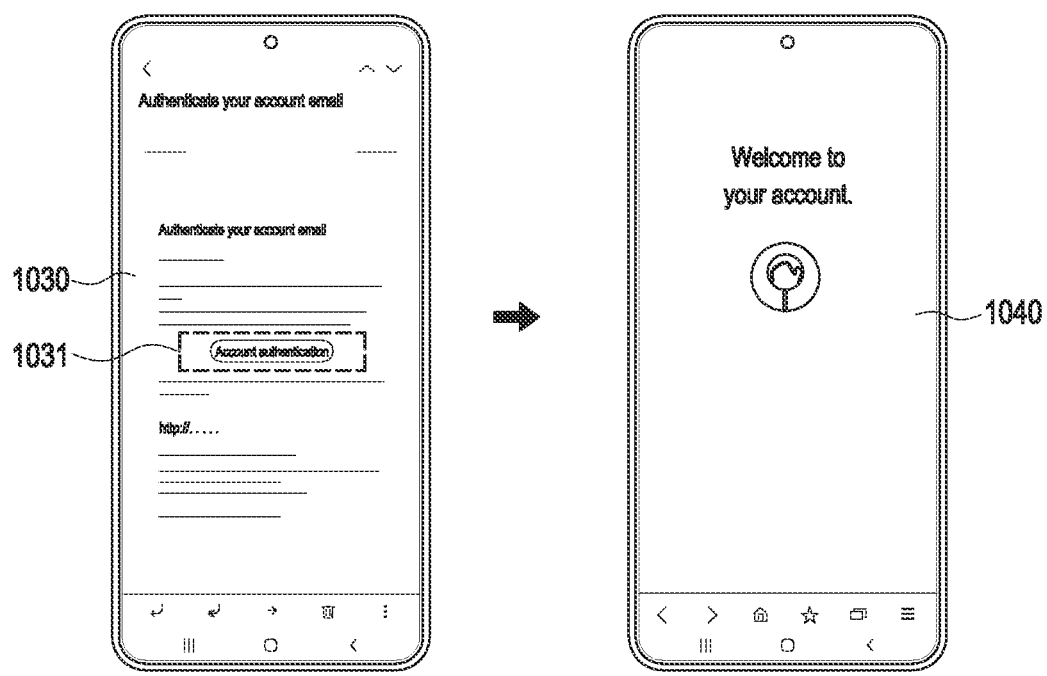
FIG. 10B is a view illustrating a user interface displayed when registering an external device according to an embodiment of the disclosure.

FIG. 10B is a view illustrating a user interface displayed when registering an external device according to an embodiment of the disclosure.

Referring to FIG. 10A, an external device (e.g., the external device 121, 122, 123, 124, and 125 in FIG. 1) (e.g., a smartphone) may display a configuration screen 1010 for account registration and metaverse registration.

According to an embodiment of the disclosure, the configuration screen 1010 may include an account item 1011 for account registration to a server (e.g., the server 100 in FIG. 1). According to an embodiment of the disclosure, in case that a user input for selecting the account item 1011 is received, the external device may display a screen 1020 including service provision items related to the account. The screen 1020 including the service provision items may include an item 1021 for register the account and/or the external device to the metaverse.

According to an embodiment of the disclosure, in case that a user input for selecting the item 1021 for register the account and/or the external device to the metaverse is received, the external device may transmit a request for registering the account and/or the external device to the metaverse.

According to an embodiment of the disclosure, the server may transmit a request for account authentication to the external device. According to an embodiment of the disclosure, the external device may display an authentication screen as shown in FIG. 10B based on the account authentication request.

Referring to FIG. 10B, the external device may display a screen 1030 for account authentication. According to an embodiment of the disclosure, the external device may perform account authentication by using another account (e.g., an e-mail) of the user of which authentication has been completed.

According to an embodiment of the disclosure, in case that a button 1031 for authenticating an account through another account (e.g., an e-mail) of the user is selected, the external device may transmit a mail for authentication to another account.

According to an embodiment of the disclosure, in case that the authentication through another account is completed, the external device may display a screen 1040 indicating completion of account registration.

According to an embodiment of the disclosure, in case that the authentication is completed through another account, the external device may inform the server that the authentication is completed, and in case of receiving the completion of the authentication, the server may store account and/or external device information in a metaverse database (e.g., the metaverse database 850 in FIG. 8).

According to an embodiment of the disclosure, the server may generate a marker based on external shape information of the external device acquired based on the account and/or external device information received from the external device and store the generated marker in the metaverse database.

Figure 11:
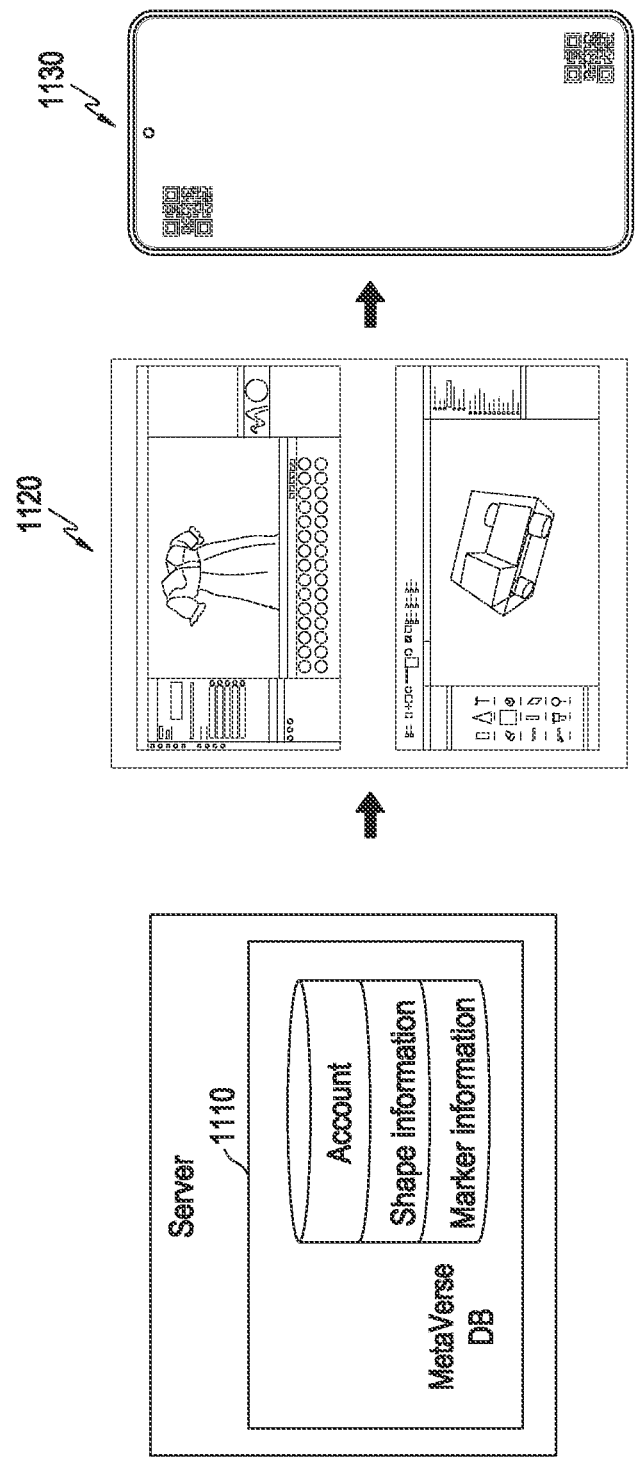
FIG. 11 is a view illustrating an operation of providing a VR content corresponding to an external device in a virtual reality based on external shape information of the external device according to an embodiment of the disclosure.

FIG. 11 is a view illustrating an operation of providing a VR content corresponding to an external device in a virtual reality based on external shape information of the external device according to an embodiment of the disclosure.

Referring to FIG. 11, a server (e.g., the sever 100 in FIG. 1) may transmit information (e.g., an account and account-related information (e.g., shape information, resolution information, and/or an image size), and/or account-related marker information) stored in a metaverse database 1110 (e.g., the metaverse database 850 in FIG. 8) to a creator tool 1120 of a virtual reality application.

According to an embodiment of the disclosure, a metaverse may be generated by controlling of a manager through the creator tool 1120 of the virtual reality application.

According to an embodiment of the disclosure, the creator tool 1120 may generate at least one VR content 1130 based on the information received from the server and stored in the metaverse database 1110. According to an embodiment of the disclosure, the VR content 1130 may be generated to have a shape similar to a real shape of an external device. According to an embodiment of the disclosure, at least one marker image including corresponding account information may be included on the VR content 1130 displayed on an execution screen (e.g., the metaverse) of the virtual reality application.

Figure 12:
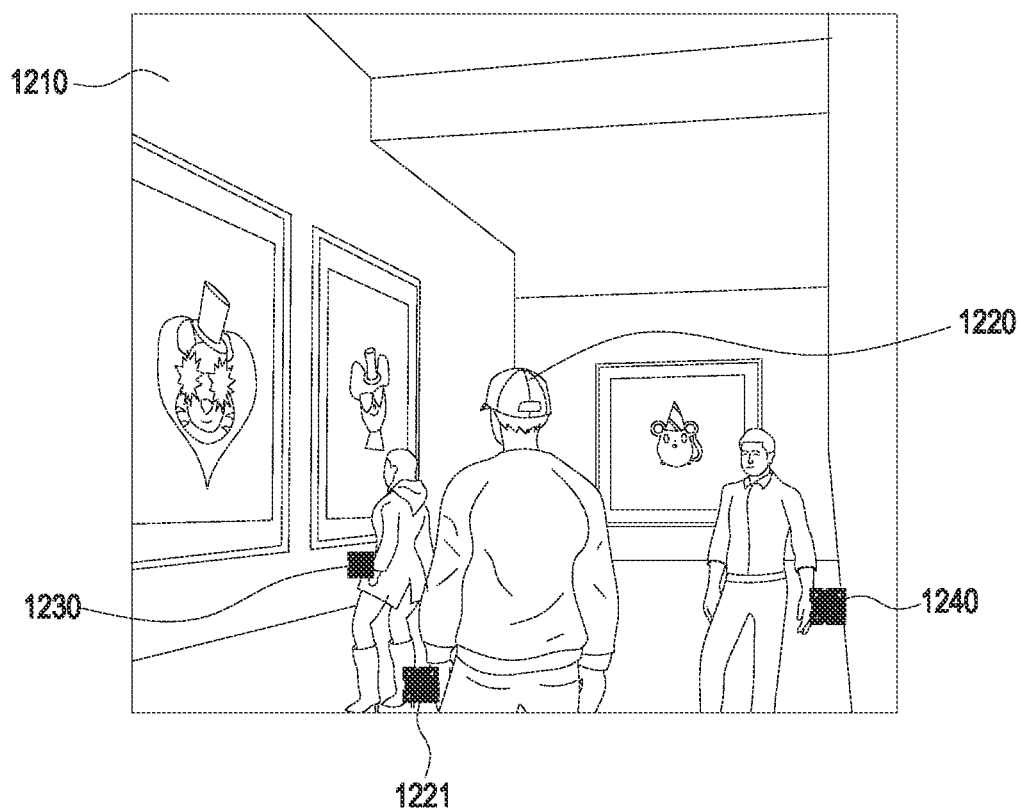
FIG. 12 is a view illustrating an execution screen of a VR application according to an embodiment of the disclosure.

FIG. 12 is a view illustrating an execution screen of a VR application according to an embodiment of the disclosure.

Referring to FIG. 12, an electronic device (e.g., the electronic device 110 in FIG. 1, the processor 111 in FIG. 1, the electronic device 200 in FIG. 2, 3A, 3B, or 4, the electronic device 300 in FIG. 5A or 5B, or the electronic device 400 in FIG. 6) may display an execution screen 1210 (e.g., the metaverse) of a virtual reality application.

According to an embodiment of the disclosure, an avatar 1220 of a user logged into the virtual reality application through the electronic device may be displayed on the execution screen 1210 of the virtual reality application.

According to an embodiment of the disclosure, other avatars in addition to the avatar 1220 of the user of the electronic device may be displayed on the execution screen 1210 of the virtual reality application, as well.

According to an embodiment of the disclosure, marker images 1221, 1230, and 1240 related to each account information may be arranged on the avatar 1220 of the user of the electronic device and/or an avatar (e.g., a hand or wrist of an avatar) of another user.

Although it is described that all marker images 1221, 1230, and 1240 are displayed in FIG. 12, according to an embodiment of the disclosure, among the marker images 1221, 1230, and 1240, a screen of an external device corresponding to a first marker image 1221 instead of the first marker image 1221 matching the account information of the user of the electronic device may be mirrored and displayed by the electronic device. According to an embodiment of the disclosure, marker images 1230 and 1240 of another user not matching the account information of the user of the electronic device may be displayed as marker images.

Although it is described that the marker images 1221, 1230, and 1240 correspond to QR codes in FIG. 12, respectively, the marker images 1221, 1230, and 1240 may include at least one checker, barcode, and/or QR code.

Although it is described that only the marker images 1221, 1230 in FIG. 12, and 1240 are displayed on the avatar 1220 of the user of the electronic device and/or the avatar of another user, according to an embodiment of the disclosure, the marker images 1221, 1230, and 1240 may be included on VR contents (e.g., the VR content 912 in FIG. 9 or the VR content 1130 in FIG. 11) having shapes of the external devices corresponding to each of the marker images 1221, 1230, and 1240.

Figure 13:
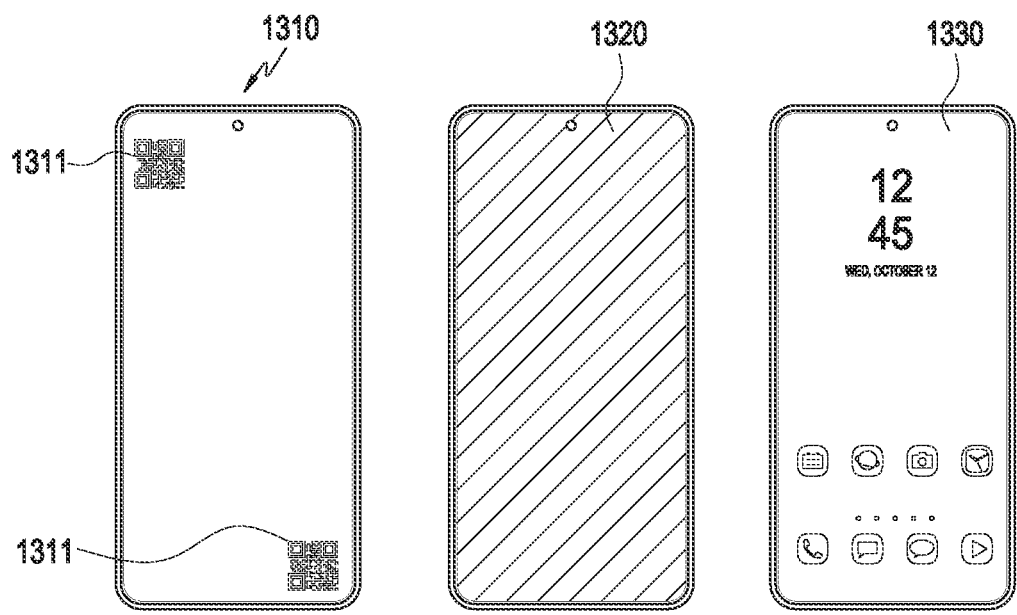
FIG. 13 is a view illustrating an operation of mirroring a screen of an external device through a marker image included in a VR content according to an embodiment of the disclosure.

FIG. 13 is a view illustrating an operation of mirroring a screen of an external device through a marker image included in a VR content according to an embodiment of the disclosure.

Referring to FIG. 13, an electronic device (e.g., the electronic device 110 in FIG. 1, the processor 111 in FIG. 1, the electronic device 200 in FIG. 2, 3A, 3B, or 4, the electronic device 300 in FIG. 5A or 5B, or the electronic device 400 in FIG. 6) may display a VR content 1310 corresponding to an external device (e.g., the external device 121, 122, 123, 124, and 125 in FIG. 1). According to an embodiment of the disclosure, the electronic device may search at least one marker image 1311 included on the VR content 1310.

According to an embodiment of the disclosure, the electronic device may identify an area 1320 in which a screen of the external device is to be mirrored based on the identified at least one marker image 1311.

For example, referring to FIG. 13, the electronic device may identify an area 1320 which corresponds to a display of the external device and is to be mirrored, based on at least one marker image 1311 disposed at a left upper boundary and a right lower boundary of the display of the external device on the VR content 1310.

Although it is described that the area 1320 to be mirrored is identified by two marker images 1311 in FIG. 13, according to an embodiment of the disclosure, an area to be mirrored may be identified by one or three or more marker images.

According to an embodiment of the disclosure, the marker image may include information related to a size, a location, and/or a shape of the display of the external device. For example, the electronic device may identify an area 1320 to be mirrored with reference to coordinates at which a marker image is displayed based on information of the display of the external device included in one marker image.

According to an embodiment of the disclosure, the electronic device may display a screen 1330 corresponding to the screen of the external device on the area 1320 to be mirrored.

Figure 14A:
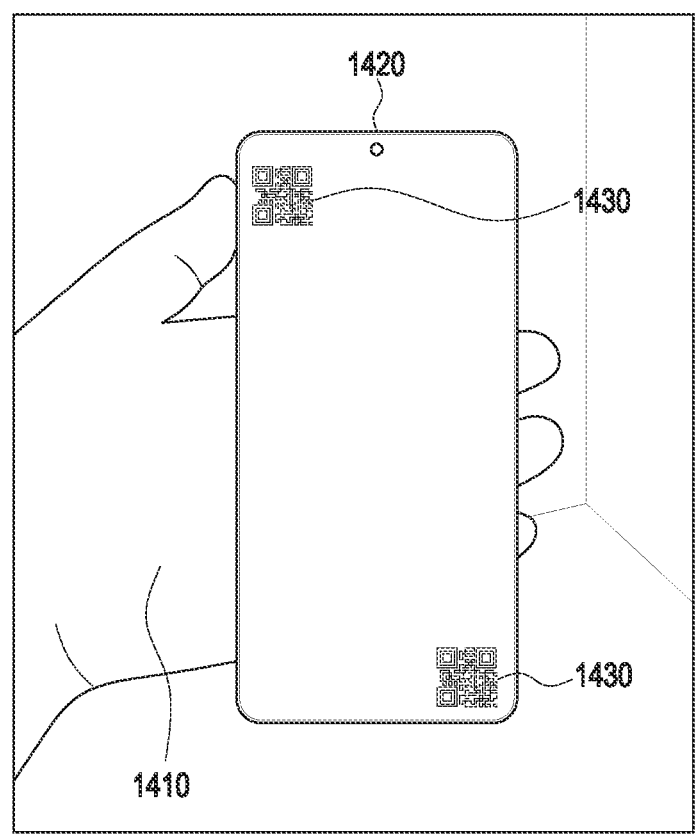
FIG. 14A is a view illustrating an operation of mirroring a screen of an external device through a marker image included in a VR content according to an embodiment of the disclosure.

FIG. 14A is a view illustrating an operation of mirroring a screen of an external device through a marker image included in a VR content according to an embodiment of the disclosure.

Figure 14B:
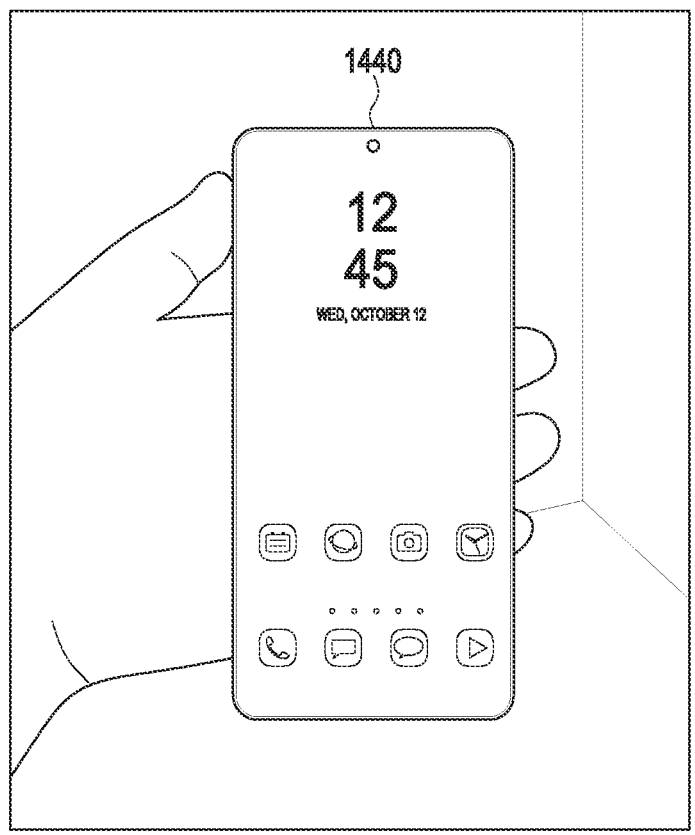
FIG. 14B is a view illustrating an operation of mirroring a screen of an external device through a marker image included in a VR content according to an embodiment of the disclosure.

FIG. 14B is a view illustrating an operation of mirroring a screen of an external device through a marker image included in a VR content according to an embodiment of the disclosure.

Referring to FIG. 14A, an electronic device (e.g., the electronic device 110 in FIG. 1, the processor 111 in FIG. 1, the electronic device 200 in FIG. 2, 3A, 3B, or 4, the electronic device 300 in FIG. 5A or 5B, or the electronic device 400 in FIG. 6) may display a VR content 1420 corresponding to an external device (e.g., the external device 121, 122, 123, 124, and 125 in FIG. 1) (e.g., a smartphone) on a hand 1410 of an avatar of the user of the electronic device in an execution screen of a virtual reality application.

According to an embodiment of the disclosure, the VR content 1420 may not be displayed in case that the VR content is placed outside the execution screen of the virtual reality application corresponding to a user's field of view. According to an embodiment of the disclosure, the VR content 1420 may be displayed only in case that the avatar raises the hand 1410 to be placed within the user's field of view.

According to an embodiment of the disclosure, at least one marker image 1430 may be displayed on the VR content 1420. According to an embodiment of the disclosure, in case that at least one marker image 1430 is searched, the electronic device may identify account information and/or information on the external device included in the marker image 1430.

According to an embodiment of the disclosure, in case that the account information included in the marker image 1430 matches the account information of the user of the electronic device, an area in which the screen of the external device is mirrored may be identified by using at least one marker image 1430.

According to an embodiment of the disclosure, the electronic device may acquire, from at least one marker image 1430, information indicating that the display of the external device has a rectangular shape and two marker images 1430 are arranged at diagonal corners of the rectangle.

According to an embodiment of the disclosure, the electronic device may identify a rectangular area having two marker image 1430 as diagonal corners thereof based on information of the display of the external device acquired from at least one marker 1430 and/or arrangement of at least one marker image 1430.

According to an embodiment of the disclosure, the electronic device may mirror a screen 1440 of the external device in the identified area on the VR content as shown in FIG. 14B.

As such, the external device may be used by mirroring the screen of the external device of the real environment within the metaverse which corresponds to the execution screen of the virtual reality application. Furthermore, according to an embodiment of the disclosure, by displaying a VR content having a shape corresponding to the real external device within the metaverse, an experience similar to using the external device in the real environment may be provided.

Figure 15A:
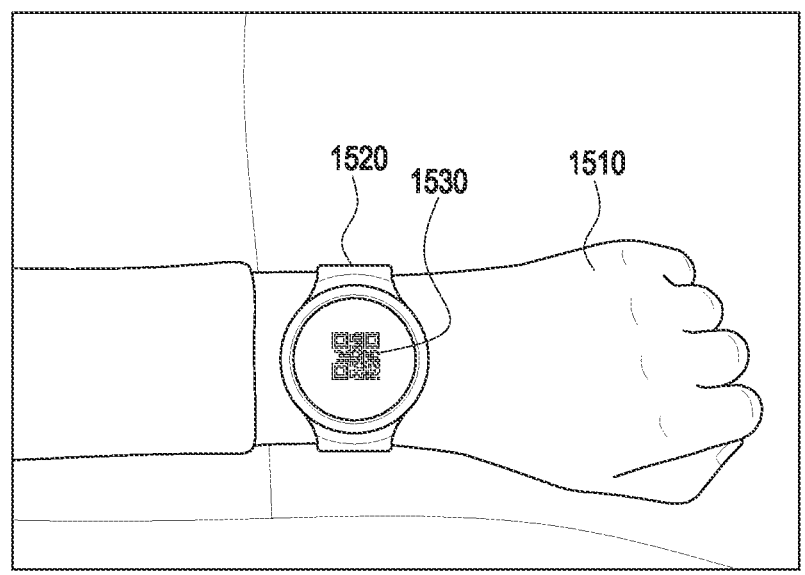
FIG. 15A is a view illustrating an operation of mirroring a screen of an external device through a marker image included in a VR content according to an embodiment of the disclosure.

FIG. 15A is a view illustrating an operation of mirroring a screen of an external device through a marker image included in a VR content according to an embodiment of the disclosure.

Figure 15B:
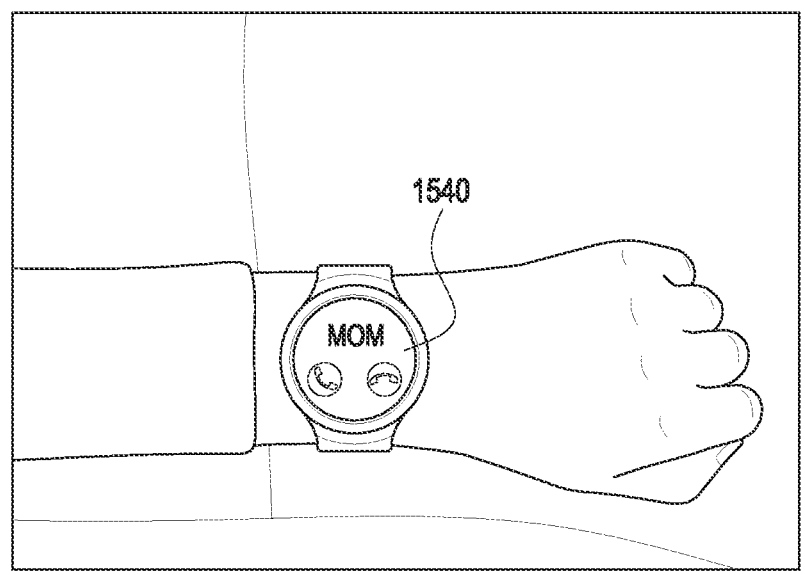
FIG. 15B is a view illustrating an operation of mirroring a screen of an external device through a marker image included in a VR content according to an embodiment of the disclosure.

FIG. 15B is a view illustrating an operation of mirroring a screen of an external device through a marker image included in a VR content according to an embodiment of the disclosure.

Referring to FIG. 15A, an electronic device (e.g., the electronic device 110 in FIG. 1, the processor 111 in FIG. 1, the electronic device 200 in FIG. 2, 3A, 3B, or 4, the electronic device 300 in FIG. 5A or 5B, or the electronic device 400 in FIG. 6) may display a VR content 1520 corresponding to an external device (e.g., the external device 121, 122, 123, 124, and 125 in FIG. 1) (e.g., a smart watch) on a wrist of a hand 1510 of an avatar of the user of the electronic device in an execution screen of a virtual reality application.

According to an embodiment of the disclosure, the VR content 1520 may not be displayed in case that the VR content is placed outside the execution screen of the virtual reality application corresponding to a user's field of view. According to an embodiment of the disclosure, the VR content 1520 may be displayed only in case that the avatar raises the hand 1510 to be placed within the user's field of view.

According to an embodiment of the disclosure, at least one marker image 1530 may be displayed on the VR content 1520. According to an embodiment of the disclosure, in case that at least one marker image 1530 is searched, the electronic device may identify account information and/or information on the external device included in the marker image 1530.

According to an embodiment of the disclosure, in case that the account information included in the marker image 1530 matches the account information of the user of the electronic device, an area in which the screen of the external device is mirrored may be identified by using at least one marker image 1530.

According to an embodiment of the disclosure, the electronic device may acquire, from at least one marker image 1530, information indicating that the display of the external device has a circular shape and a marker images 1530 is disposed at the center of the circular shape.

According to an embodiment of the disclosure, the electronic device may identify a circular area centered on the marker image 1530 based on information of the display of the external device acquired from at least one marker 1530 and/or arrangement of at least one marker image 1530.

According to an embodiment of the disclosure, the electronic device may mirror a screen 1540 of the external device in the identified area on the VR content as shown in FIG. 14B.

As such, the external device may be used by mirroring the screen of the external device of the real environment within the metaverse which corresponds to the execution screen of the virtual reality application. Furthermore, according to an embodiment of the disclosure, by displaying a VR content having a shape corresponding to the real external device within the metaverse, an experience similar to using the external device in the real environment may be provided.

Figure 16:
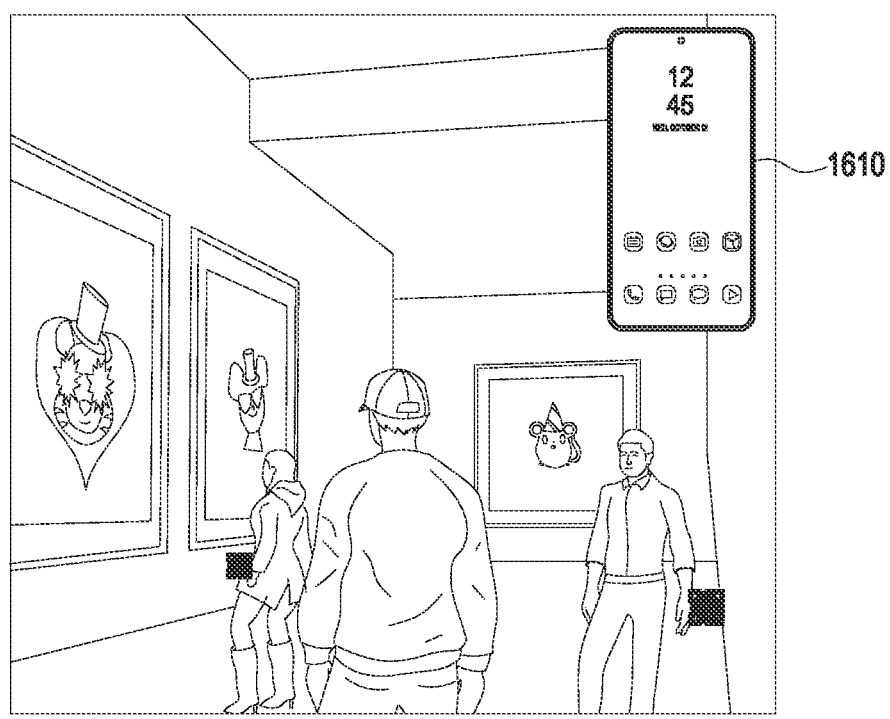
FIG. 16 is a view illustrating an operation of mirroring a screen of an external device through a marker image included in a VR content according to an embodiment of the disclosure.

FIG. 16 is a view illustrating an operation of mirroring a screen of an external device through a marker image included in a VR content according to an embodiment of the disclosure.

Referring to FIG. 16, an electronic device (e.g., the electronic device 110 in FIG. 1, the processor 111 in FIG. 1, the electronic device 200 in FIG. 2, 3A, 3B, or 4, the electronic device 300 in FIG. 5A or 5B, or the electronic device 400 in FIG. 6) may display a VR content 1610 corresponding to an external device (e.g., the external device 121, 122, 123, 124, and 125 in FIG. 1) on an area of a display (e.g., the display 115 in FIG. 1).

According to an embodiment of the disclosure, the electronic device may display the VR content 1610 corresponding to the external device on an area irrelevant to an avatar of the user by a manufacturer or user configuration. According to an embodiment of the disclosure, at least one marker image may be included on the VR content 1610.

According to an embodiment of the disclosure, the electronic device may mirror a screen of a first external device on an area corresponding to at least one marker image.

According to an embodiment of the disclosure, the VR content 1610 may be overlaid and displayed on a portion of an execution screen of a virtual reality application, such as being displayed at a higher layer than the execution screen of the virtual reality application even if a location of the execution screen of the virtual reality application is changed or an action of an avatar is changed.

As such, as the VR content 1610 mirroring the screen of the external device is continuously displayed on an area of the display, the user may identify an event of the external device or control the external device without performing separate action for identifying the external device through the avatar.

Figure 17A:
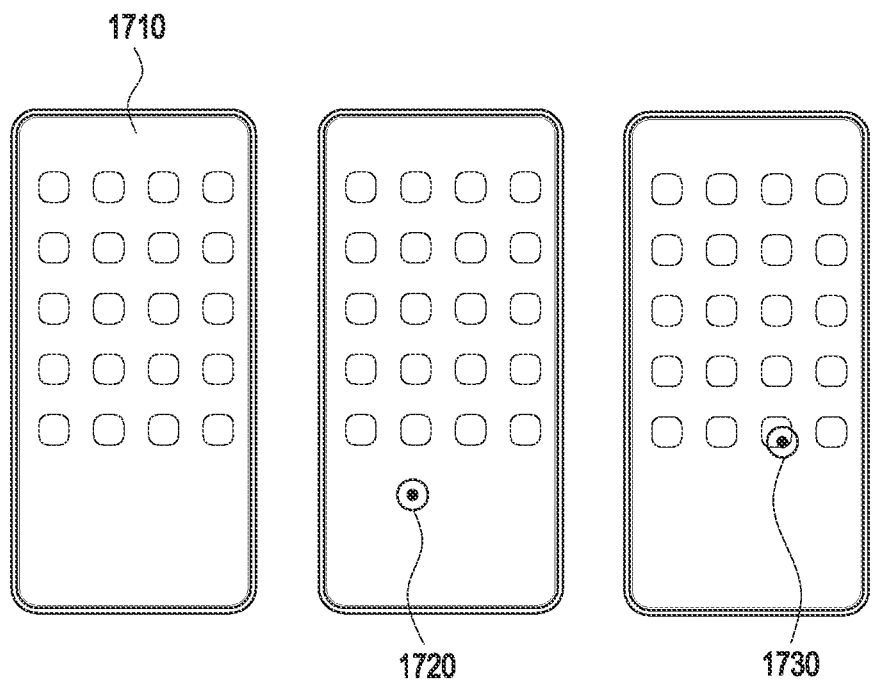
FIG. 17A is a view illustrating an operation of receiving a user input through a mirroring screen according to an embodiment of the disclosure.

FIG. 17A is a view illustrating an operation of receiving a user input through a mirroring screen according to an embodiment of the disclosure.

Figure 17B:
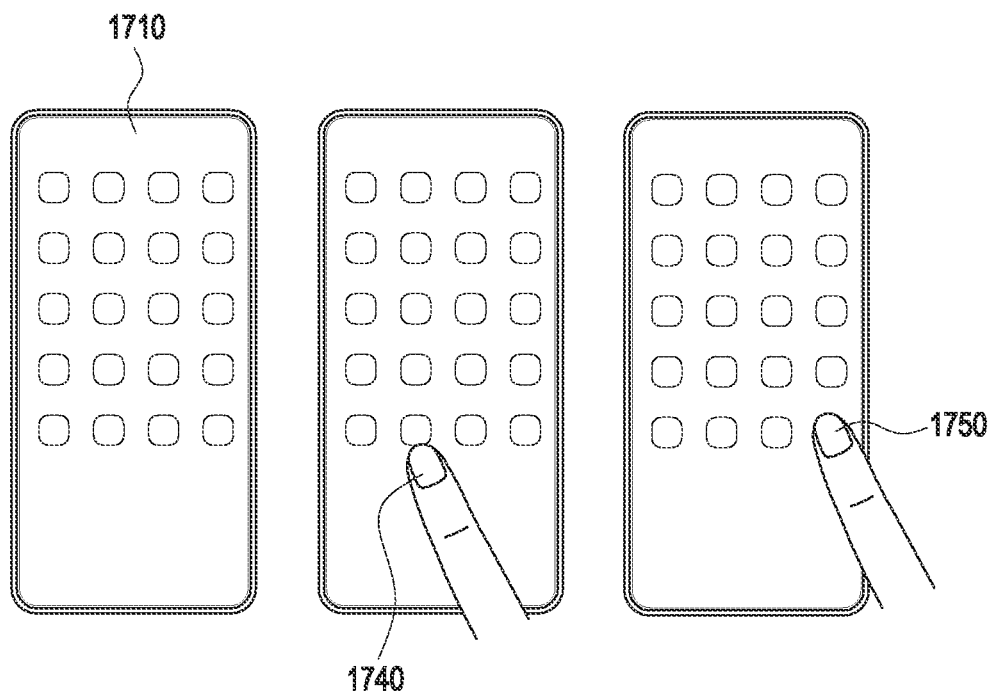
FIG. 17B is a view illustrating an operation of receiving a user input through a mirroring screen according to an embodiment of the disclosure.

FIG. 17B is a view illustrating an operation of receiving a user input through a mirroring screen according to an embodiment of the disclosure.

Referring to FIGS. 17A and 17B, an electronic device (e.g., the electronic device 110 in FIG. 1, the processor 111 in FIG. 1, the electronic device 200 in FIG. 2, 3A, 3B, or 4, the electronic device 300 in FIG. 5A or 5B, or the electronic device 400 in FIG. 6) may display a screen 1710 mirroring a screen of an external device (e.g., the external device 121, 122, 123, 124, and 125 in FIG. 1).

According to an embodiment of the disclosure, the electronic device may recognize a pointer 1720 on the mirrored screen 1710. According to an embodiment of the disclosure, the point 1720 may be generated and/or controlled through the external device (e.g., a remote controller) for inputting user control and/or tracking user's gaze.

According to an embodiment of the disclosure, as shown in FIG. 17A, the electronic device may acquire coordinate information of a location of the pointer 1720 based on coordinate information of the mirrored screen 1710 displayed within an execution screen of a virtual reality application. For example, the electronic device may identify whether the point 1720 is located on a portion of the mirrored screen 1710 not a location of the pointer within the execution screen of the virtual reality application.

According to an embodiment of the disclosure, the electronic device may acquire a time-dependent location change of the pointer 1720 and may identify a type of a user input when receiving the user input for controlling the external device through the pointer 1730 at the changed location.

According to an embodiment of the disclosure, the electronic device may identify whether a button input is received through the external device (e.g., a remote controller) for inputting user control or a type of user input, such as whether the user input includes a touch input or a double-tab input through a gesture input.

According to an embodiment of the disclosure, the electronic device may identify a type of user input, such as whether the user input includes a touch input or a double-tab input, based on eye blinking and/or pupil movement through gaze tracking.

According to an embodiment of the disclosure, in case of a gesture input and/or gaze tracking through the external device, a type of a user input may be identified through a deep learning algorithm.

According to an embodiment of the disclosure, as shown in FIG. 17B, the electronic device may acquire coordinate information of a location of a finger 1740 based on coordinate information of the mirrored screen 1710 displayed within an execution screen of a virtual reality application. For example, the electronic device may identify whether the finger 1740 is located on a portion of the mirrored screen 1710 not a location of the finger within the execution screen of the virtual reality application. According to an embodiment of the disclosure, the electronic device may recognize a tip of the finger 1740 as a pointer.

According to an embodiment of the disclosure, the electronic device may acquire a time-dependent location change of the finger 1740 and may identify a type of the user input when receiving the user input for controlling the external device through the finger 1750 at the changed location.

According to an embodiment of the disclosure, the electronic device may identify a type of the user input, such as whether the user input includes a touch input or a double-tab input, based on a gesture of the finger 1750.

According to an embodiment of the disclosure, the electronic device may identify a type of the user input through a deep learning algorithm.

According to an embodiment of the disclosure, the electronic device may transmit the coordinate information of the user input and information on a type of the user input to the external device.

Figure 18:
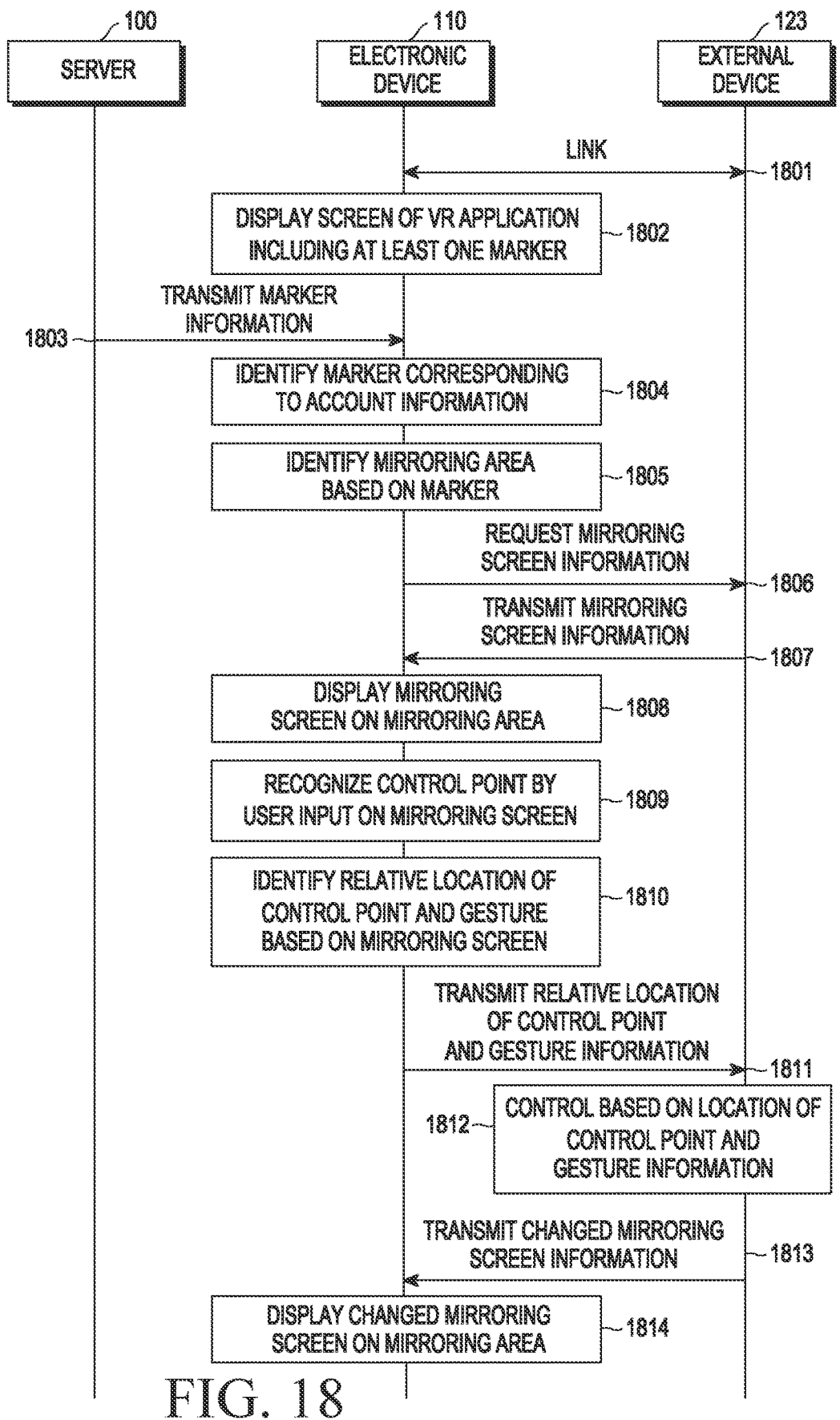
FIG. 18 is a signal flow diagram illustrating an operation of controlling an external device in a virtual reality provided through an electronic device according to an embodiment of the disclosure.

FIG. 18 is a signal flow diagram illustrating an operation of controlling an external device in a virtual reality provided through an electronic device according to an embodiment of the disclosure.

Referring to FIG. 18, in operation 1801, an electronic device 110 (e.g., the electronic device 110 in FIG. 1) may be linked to an external device 123 (e.g., the electronic device 121, 122, 123, 124, or 125 in FIG. 1).

According to an embodiment of the disclosure, account registration (e.g., 810 and 820 in FIG. 8) and/or device registration (e.g., 811 and 821 in FIG. 8) of the external 123 to a server 100 (e.g., the server 100 in FIG. 1) may be completed before linkage or after linkage.

According to an embodiment of the disclosure, in operation 1802, the electronic device 110 may display a screen of a VR application including at least one marker.

According to an embodiment of the disclosure, the screen of the VR application may be provided from the server 100, and at least one marker among a plurality of markers registered to the server may be included in the screen of the VR application. According to an embodiment of the disclosure, at least one marker may be included on a VR content generated based on external shape information of the external device 123 corresponding to the marker.

According to an embodiment of the disclosure, in operation 1803, the server 100 may transmit marker information to the electronic device 110. According to an embodiment of the disclosure, the server 100 may transmit marker information of a user logged into the VR application to the electronic device 110. According to an embodiment of the disclosure, the marker information may include account information and/or device information (e.g., information on a size, location, and/or shape of a display) of the external device 123.

According to an embodiment of the disclosure, in operation 1804, the electronic device 110 may identify a marker corresponding to the account information. According to an embodiment of the disclosure, the electronic device 110 may identify a marker including account information identical to account information logged in through the electronic device 110 among at least one marker included on the screen of the VR application.

According to an embodiment of the disclosure, in operation 1805, the electronic device 110 may identify a mirroring area based on the marker. According to an embodiment of the disclosure, the electronic device 110 may identify a mirroring area corresponding to the size, location, and/or shape of the display of the external device 123 on the VR content based on the marker.

According to an embodiment of the disclosure, in operation 1806, the electronic device 110 may request mirroring screen information from the external device 123. According to an embodiment of the disclosure, the mirroring screen may correspond to a screen displayed on the display of the external device 123.

According to an embodiment of the disclosure, in operation 1807, the external device 123 may transmit the mirroring screen to the electronic device 110.

According to an embodiment of the disclosure, in operation 1808, the electronic device 110 may display the mirroring screen on the mirroring area.

According to an embodiment of the disclosure, in operation 1809, the electronic device 110 may recognize a control point by a user input on the mirroring screen. According to an embodiment of the disclosure, the control point may be generated and/or controlled through the external device (e.g., a remote controller) for inputting user control, tracking user's gaze and/or a user's hand According to an embodiment of the disclosure, in operation 1810, the electronic device 110 may identify a relative location of the control point and a type (e.g., a gesture) of the user input, based on the mirroring screen. According to an embodiment of the disclosure, the electronic device 110 may acquire coordinate information of the control point within the mirroring screen based on coordinates of the mirroring screen.

According to an embodiment of the disclosure, the electronic device 110 may acquire a type of the user input through the control point. According to an embodiment of the disclosure, the electronic device 110 may identify a type of the user input, such as a touch, double tab, or dragging by using a deep learning algorithm.

According to an embodiment of the disclosure, in operation 1811, the electronic device 110 may transmit the relative location of the control point and gesture information to the external device 123.

Although it is described that the electronic device 110 identifies the relative location of the control point on the mirroring screen and then transmit same to the external device 123 in FIG. 18, according to an embodiment of the disclosure, the electronic device 110 may provide only the coordinate information of the mirroring screen and the coordinate information of the control point to the external device 123, and the external device 123 may identify a location corresponding to the control point on the display of the external device 123 based on the coordinate information of the mirroring screen and the coordinate information of the control point.

According to an embodiment of the disclosure, in operation 1812, the external device 123 may perform control based on the location of the control point and the gesture information. For example, in case that a user input for touching an icon of a specific application is received through the control point within the mirroring screen, the external device 123 may perform the specific application based on the location information of the control point and a type of the user input as if the specific application displayed on the display were selected by a touch.

According to an embodiment of the disclosure, the external device 123 may display a controlled screen based on the location information of the control point and the gesture information received from the electronic device 110. For example, the external device 123 may display an execution screen of a specific application on the display.

According to an embodiment of the disclosure, in operation 1813, the external device 123 may transmit information on a changed mirroring screen to the electronic device 110.

According to an embodiment of the disclosure, in operation 1814, the electronic device 110 may display the changed mirroring screen on the mirroring area. According to an embodiment of the disclosure, the electronic device 110 may replace the pre-displayed mirroring screen with the changed mirroring screen based on the information on the changed mirroring screen received from the external device 123.

Figure 19:
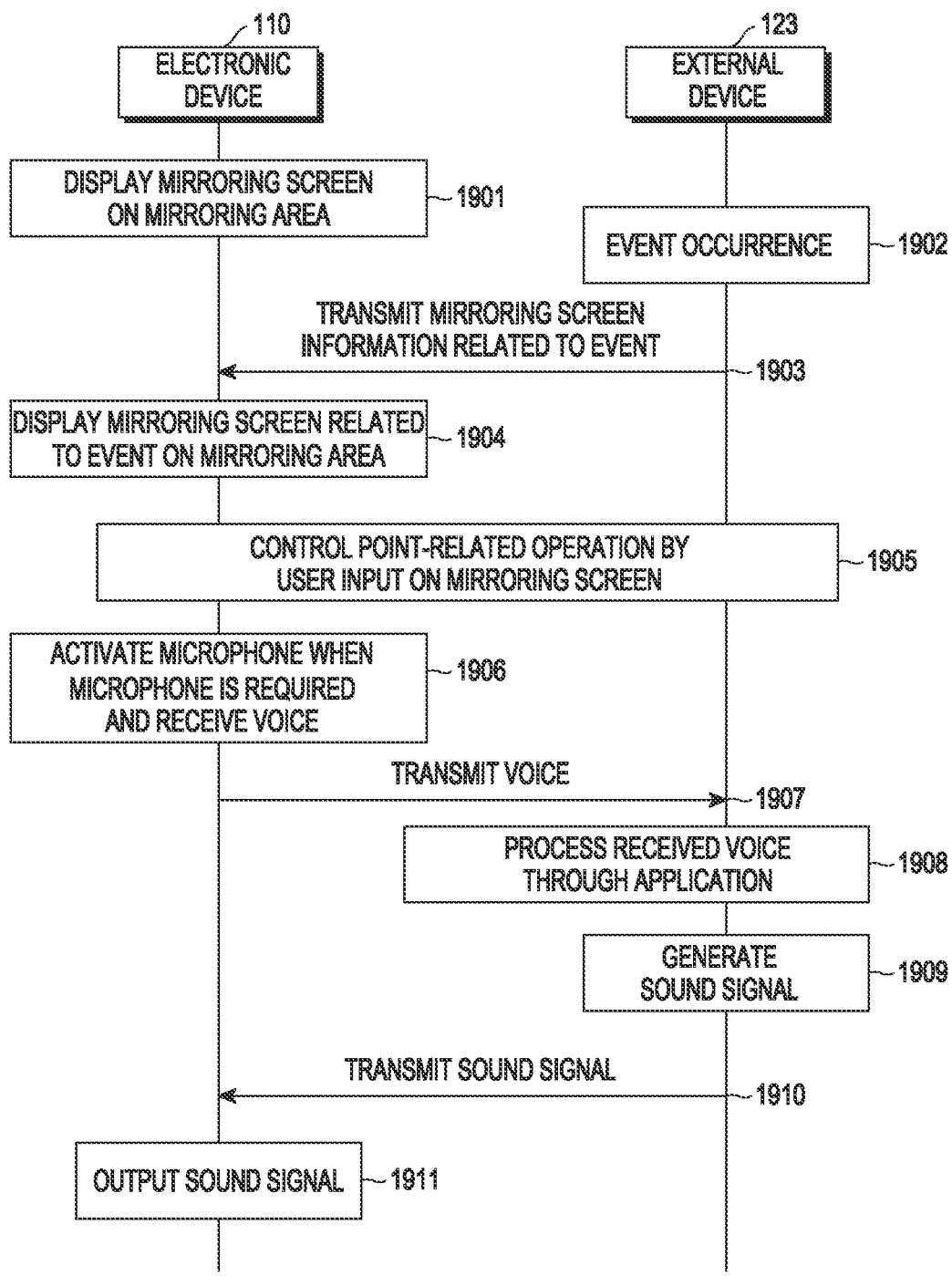
FIG. 19 is a signal flow diagram illustrating an operation of controlling an external device in a virtual reality provided through an electronic device when an event occurs in the external device according to an embodiment of the disclosure.

FIG. 19 is a signal flow diagram illustrating an operation of controlling an external device in a virtual reality provided through an electronic device when an event occurs in the external device according to an embodiment of the disclosure.

Referring to FIG. 19, in operation 1901, an electronic device 110 (e.g., the electronic device 110 in FIG. 1) may display a mirroring screen on a mirroring area. According to an embodiment of the disclosure, operation 1901 is identical to operation 1808 in FIG. 18, operations before operation 1901 are identical to operation 1801 to operation 1807 in FIG. 18, and thus an overlapping description will be omitted.

According to an embodiment of the disclosure, in operation 1902, the external device 123 may detect event occurrence. According to an embodiment of the disclosure, an event may include an operation of changing a screen, such as reception of a new message and/or mail or reception of a call.

According to an embodiment of the disclosure, in operation 1903, the external device 123 may transmit a mirroring screen related to the event to the electronic device 110. According to an embodiment of the disclosure, the mirroring screen related to the event may be different from the mirroring screen displayed in operation 1901.

According to an embodiment of the disclosure, in operation 1904, the electronic device 110 may display the mirroring screen related to the event on the mirroring area.

According to an embodiment of the disclosure, in operation 1905, the electronic device 110 and/or the external device 123 may perform an operation related to the control point by the user input on the mirroring screen. For example, in case of selecting an operation of touching an notification on the displayed mirroring screen or selecting a user interface for answering a phone call, the electronic device 110 may transmit the location information of the control point and the information on the type of the user input to the external device 123, and the external device 123 may change a screen based on the received control point information and transmit the changed mirroring screen information to the electronic device 110.

According to an embodiment of the disclosure, operation 1905 is identical to operation 1809 to operation 1814 in FIG. 18, and thus an overlapping description will be omitted.

According to an embodiment of the disclosure, in operation 1906, the electronic device 110 may activate a microphone when the microphone is required and receive a voice.

According to an embodiment of the disclosure, the electronic device 110 may activate the microphone based on a request received from the external device 123. According to an embodiment of the disclosure, in case that an event requiring a voice input, such as call reception occurs, the external device 123 may transmit a request for activating the microphone to the electronic device 110.

According to an embodiment of the disclosure, in case that a voice input is required, the electronic device 110 may activate the microphone. For example, in case that a wake-up voice (e.g., Hi, Bixby) for controlling the external device 123 with a voice is received or a gesture input and/or gaze tracking for inputting a voice is received through the execution screen of the virtual reality application, the electronic device 110 may active the microphone.

According to an embodiment of the disclosure, in operation 1907, the electronic device 110 may transmit a voice to the external device 123.

According to an embodiment of the disclosure, in operation 1908, the external device 123 may process the received voice through an application. For example, in case that the event corresponds to a call application, the external device 123 may transmit the received voice to a counterpart of the call. According to an embodiment of the disclosure, in case that the voice received through the electronic device 110 is a voice command, the external device 123 may control an application based on the voice command.

According to an embodiment of the disclosure, in case that the event corresponds to call reception, operation 1909 to operation 1911 may be further performed.

According to an embodiment of the disclosure, in operation 1909, the external device 123 may generate a sound signal. For example, the external device 123 may receive a voice of a counterpart of the call and generate a sound signal based on the received voice.

According to an embodiment of the disclosure, in operation 1910, the external device 123 may transmit the sound signal to the electronic device 110.

According to an embodiment of the disclosure, in operation 1911, the electronic device 110 may output the received sound signal through a speaker (e.g., the input/output device 113 in FIG. 1).

As such, the external device may be controlled through the electronic device without direct use of the external device in the metaverse.

According to an embodiment of the disclosure, an electronic device (e.g., the electronic device 110 in FIG. 1, the electronic device 200 in FIG. 2, 3A, 3B, or 4, the electronic device 300 in FIG. 5A or 5B, or the electronic device 400 in FIG. 6) may include a display (e.g., the display 115 in FIG. 1), a communication module (e.g., the communication device 117 in FIG. 1), and at least one processor (e.g., the processor 111 in FIG. 1) operatively connected to the display and the communication module.

According to an embodiment of the disclosure, the at least one processor may execute a virtual reality (VR) application.

According to an embodiment of the disclosure, the at least one processor may identify, based on displaying of a VR content (e.g., the VR content 912 in FIG. 9, the VR content 1130 in FIG. 11, the VR content 1310 in FIG. 13, the VR content 1420 in FIG. 14A, the VR content 1520 in FIG. 15A, or the VR content 1610 in FIG. 16) related to a first external device (e.g., the external electronic device 121, 122, 123, 124, or 125 in FIG. 1) connected through the communication module while the VR application is executed, at least one marker image (e.g., the marker image 1221, 1230, or 1240 in FIG. 12, the marker image 1311 in FIG. 13, the marker image 1430 in FIG. 14A, or the marker image 1530 in FIG. 15A) included in the VR content.

According to an embodiment of the disclosure, the at least one processor may identify an area (e.g., the area 1320 to be mirrored in FIG. 13) for mirroring a screen of the first external device based on at least one marker image based on matching of account information included in the at least one marker image and account information of the VR application.

According to an embodiment of the disclosure, the at least one processor may display a screen (e.g., the screen 1330 corresponding to the screen of the external device in FIG. 13, the screen 1440 of the external device in FIG. 14B, the screen 1540 of the external device in FIG. 15B, the screen 1710 mirroring the screen of the external device in FIG. 17A, or the screen 1710 mirroring the screen of the external device in FIG. 17B) on the area.

According to an embodiment of the disclosure, the first external device may be registered to a server (e.g., the server 100 in FIG. 1 and the server 100 in FIG. 8) in association with the account of the VR application through the first external device.

According to an embodiment of the disclosure, the VR content may be generated from the server, based on an external shape of the first external device.

According to an embodiment of the disclosure, the VR content may be displayed on an execution screen of the VR application provided by the server.

According to an embodiment of the disclosure, the marker image may be generated from the server in association with the first external device and the account based on registration of the first external device to the server.

According to an embodiment of the disclosure, the marker image may be included in an execution screen of the VR application provided by the server.

According to an embodiment of the disclosure, the at least one processor may display, based on matching of the account information of the VR application and account information included in a marker image among a plurality of marker images included in an execution screen of the VR application, a screen of the first external device by replacing the marker image.

According to an embodiment of the disclosure, the at least one processor may display, based on non-matching of the account information of the VR application and account information included in a marker image among the plurality of marker, the marker image.

According to an embodiment of the disclosure, the at least processor may transmit, based on a user input received on a screen of the first external device displayed on the area, control information for controlling the first external device to the first external device.

According to an embodiment of the disclosure, the at least one processor may acquire, based on coordinate information of the area on which a screen of the first external device is displayed, coordinate information of the user input related to a location of the user input within the screen of the first external device.

According to an embodiment of the disclosure, the at least one processor may transmit the coordinate information of the user input and information on a type of the user input to the first external device.

According to an embodiment of the disclosure, the at least one processor may replace a first screen with a second screen in a state of displaying the first screen of the first external device, based on reception of screen information on the second screen different from the first screen from the first external device.

According to an embodiment of the disclosure, the at least one processor may display a second VR content related to a second external device connected through the communication module.

According to an embodiment of the disclosure, the at least one processor may identify, based on identification of at least one second marker image included in the second VR content, a second area for mirroring a screen of the second external device.

According to an embodiment of the disclosure, the at least one processor may display a screen of the second external device on the second area.

According to an embodiment of the disclosure, the VR content may be disposed on a body portion of a virtual person corresponding to the account and may be determined to be displayed based on a behavior of the virtual person.

According to an embodiment of the disclosure, a server (e.g., the server 100 in FIG. 1 or the server 100 in FIG. 8) may include a communication module (e.g., the communication module 107 in FIG. 1), a memory (e.g., the memory 102 in FIG. 1), and at least one processor (e.g., the processor 101 in FIG. 1) operatively connected to the communication module and the memory.

According to an embodiment of the disclosure, in case that an account registration request for a VR application is received from an external device through the communication module, the at least one processor may acquire external shape information corresponding to the external device from among a plurality of pieces of external shape information of electronic devices stored in the memory.

According to an embodiment of the disclosure, the at least one processor may generate a marker image based on the account of which registration has been requested and external shape information of the external device.

According to an embodiment of the disclosure, the at least one processor may transmit an execution screen of the VR application including the marker image to a wearable electronic device connected through the communication module.

According to an embodiment of the disclosure, a control method of an electronic device may include an operation of executing a virtual reality (VR) application.

According to an embodiment of the disclosure, the control method of the electronic device may include an operation of identifying, based on displaying of a VR content related to a first external device connected through the communication module while the VR application is executing, at least one marker image included in the VR content.

According to an embodiment of the disclosure, the control method of the electronic device may include an operation of identifying an area for mirroring a screen of the first external device based on at least one marker image based on matching of account information included in the at least one marker image and account information of the VR application.

According to an embodiment of the disclosure, the control method of the electronic device may include an operation of displaying a screen of the first external device on the area.

According to an embodiment of the disclosure, the first external device may be registered to a server related to the account of the VR application through the first external device.

According to an embodiment of the disclosure, the VR content may be generated from the server, based on an external shape of the first external device.

According to an embodiment of the disclosure, the VR content may be displayed on an execution screen of the VR application provided by the server.

According to an embodiment of the disclosure, the marker image may be generated from the server in association with the first external device and the account based on registration of the first external device to the server.

According to an embodiment of the disclosure, the marker image may be included in an execution screen of the VR application provided by the server.

According to an embodiment of the disclosure, the operation of displaying, based on matching of the account information of the VR application and account information included in a marker image among a plurality of marker images included in an execution screen of the VR application, the screen of the first external device on the area may display a screen of the first external device by replacing the marker image.

According to an embodiment of the disclosure, the operation of displaying, based on non-matching of the account information of the VR application and account information included in a marker image among the plurality of marker, the screen of the first external device on the area may display the marker image.

According to an embodiment of the disclosure, the control method of the electronic device may further include an operation of transmitting, based on a user input received on a screen of the first external device displayed on the area, control information for controlling the first external device to the first external device.

According to an embodiment of the disclosure, the operation of transmitting control information for controlling the first external device to the first external device may acquire, based on coordinate information of the area on which a screen of the first external device is displayed, coordinate information of the user input related to a location of the user input within the screen of the first external device.

According to an embodiment of the disclosure, the operation of transmitting control information for controlling the first external device to the first external device may transmit the coordinate information of the user input and information on a type of the user input to the first external device.

According to an embodiment of the disclosure, the control method of the electronic device may further include an operation of replacing a first screen with a second screen in a state of displaying the first screen of the first external device, based on reception of screen information on the second screen different from the first screen from the first external device.

According to an embodiment of the disclosure, the control method of the electronic device may further include an operation of displaying a second VR content related to a second external device connected through the communication module.

According to an embodiment of the disclosure, the control method of the electronic device may further include an operation of identifying, based on identification of at least one second marker image included in the second VR content, a second area for mirroring a screen of the second external device.

According to an embodiment of the disclosure, the control method of the electronic device may further include an operation of displaying a screen of the second external device on the second area.

According to an embodiment of the disclosure, the VR content may be disposed on a body portion of a virtual person corresponding to the account and may be determined to be displayed based on a behavior of the virtual person.

According to an embodiment of the disclosure, in case that an account registration request for a VR application is received from an external device through the communication module, a control method of a server may include an operation of acquiring external shape information corresponding to the external device from among a plurality of pieces of external shape information of electronic devices stored in the memory.

According to an embodiment of the disclosure, the control method for the server may include an operation of generating a marker image based on the account of which registration has been requested and external shape information of the external device.

According to an embodiment of the disclosure, the control method for the server may include an operation of transmitting an execution screen of the VR application including the marker image to a wearable electronic device connected through the communication module.

According to an embodiment of the disclosure, a non-transitory computer-readable recording medium may store at least one program, wherein the at least one program includes instructions for an electronic device to execute a virtual reality (VR) application.

According to an embodiment of the disclosure, the at least one program may include instructions for the electronic device to identify, based on displaying of a VR content related to a first external device connected through the communication module while the VR application is executing, at least one marker image included in the VR content.

According to an embodiment of the disclosure, the at least one program may include instructions for the electronic device to identify an area for mirroring a screen of the first external device based on at least one marker image based on matching of account information included in the at least one marker image and account information of the VR application.

According to an embodiment of the disclosure, the at least one program may include instructions for the electronic device to display a screen of the first external device on the area.

According to an embodiment of the disclosure, the first external device may be registered to a server related to the account of the VR application through the first external device.

According to an embodiment of the disclosure, the VR content may be generated from the server, based on an external shape of the first external device.

According to an embodiment of the disclosure, the VR content may be displayed on an execution screen of the VR application provided by the server.

According to an embodiment of the disclosure, the marker image may be generated from the server in association with the first external device and the account based on registration of the first external device to the server.

According to an embodiment of the disclosure, the marker image may be included in an execution screen of the VR application provided by the server.

According to an embodiment of the disclosure, the at least one program may include instructions for the electronic device to display, based on matching of the account information of the VR application and account information included in a marker image among a plurality of marker images included in an execution screen of the VR application, a screen of the first external device by replacing the marker image.

According to an embodiment of the disclosure, the at least one program may include instructions for the electronic device to display, based on non-matching of the account information of the VR application and account information included in a marker image among the plurality of marker, the marker image.

According to an embodiment of the disclosure, the at least one program may include instructions for the electronic device to transmit, based on a user input received on a screen of the first external device displayed on the area, control information for controlling the first external device to the first external device.

According to an embodiment of the disclosure, the at least one program may include instructions for the electronic device to acquire, based on coordinate information of the area on which a screen of the first external device is displayed, coordinate information of the user input related to a location of the user input within the screen of the first external device.

According to an embodiment of the disclosure, the at least one program may include instructions for the electronic device to transmit the coordinate information of the user input and information on a type of the user input to the first external device.

According to an embodiment of the disclosure, the at least one program may include instructions for the electronic device to replace a first screen with a second screen in a state of displaying the first screen of the first external device, based on reception of screen information on the second screen different from the first screen from the first external device.

According to an embodiment of the disclosure, the at least one program may include instructions for the electronic device to display a second VR content related to a second external device connected through the communication module.

According to an embodiment of the disclosure, the at least one program may include instructions for the electronic device to identify, based on identification of at least one second marker image included in the second VR content, a second area for mirroring a screen of the second external device.

According to an embodiment of the disclosure, the at least one program may include instructions for the electronic device to display a screen of the second external device on the second area.

According to an embodiment of the disclosure, the VR content may be disposed on a body portion of a virtual person corresponding to the account and may be determined to be displayed based on a behavior of the virtual person.

According to an embodiment of the disclosure, a non-transitory computer-readable recording medium may store at least one program, wherein the at least one program includes instructions for a server to execute a virtual reality (VR) application. There may be included instructions for acquiring external shape information corresponding to an external device from among a plurality of pieces of external shape information of electronic devices stored in the memory in case that an account registration request for a VR application is received from the external device through the communication module.

According to an embodiment of the disclosure, the at least one program may include instructions for the server to generate a marker image based on the account of which registration has been requested and external shape information of the external device.

According to an embodiment of the disclosure, the at least one program may include instructions for the server to transmit an execution screen of the VR application including the marker image to a wearable electronic device connected through the communication module.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiments of the disclosure, each component (e.g., a module or a program) of the above-described components may include a single entity or multiple entities, and some of the multiple entities may be separately disposed in different components. According to an embodiments of the disclosure, one or more of the above-described components may be omitted, or one or more other components may be added. Alternatively or additionally, a plurality of components (e.g., modules or programs) may be integrated into a single component. In such a case, according to an embodiments of the disclosure, the integrated component may still perform one or more functions of each of the plurality of components in the same or similar manner as they are performed by a corresponding one of the plurality of components before the integration. According to an embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a communication module; and
at least one processor operatively connected to the display and the communication module,
wherein the at least one processor is configured to:
execute a virtual reality (VR) application,
identify, based on displaying a VR content related to a first external device connected through the communication module while the VR application is executed, at least one marker image included in the VR content,
identify, based on matching of account information included in the at least one marker image and account information of the VR application, an area for mirroring a screen of the first external device based on the at least one marker image, and
display a screen of the first external device on the area.

2. The electronic device of claim 1,
wherein the first external device is registered to a server in association with an account of the VR application through the first external device, and
wherein the VR content is generated from the server based on an external shape of the first external device and displayed on an execution screen of the VR application provided by the server.

3. The electronic device of claim 2, wherein the marker image is generated from the server in association with the first external device and the account, based on registration of the first external device to the server and included in an execution screen of the VR application provided by the server.

4. The electronic device of claim 1, wherein the at least one processor is further configured to:
display, based on matching of the account information of the VR application and account information included in a marker image among a plurality of marker images included in an execution screen of the VR application, a screen of the first external device by replacing the marker image, and
display, based on non-matching of account information included in the marker image and the account information of the VR application among the plurality of marker images, the marker image.

5. The electronic device of claim 1, wherein the at least one processor is further configured to transmit, based on a user input received on a screen of the first external device displayed on the area, control information for controlling the first external device to the first external device.

6. The electronic device of claim 5, wherein the at least one processor is further configured to:
acquire, based on coordinate information of the area on which a screen of the first external device is displayed, coordinate information of the user input related to a location of the user input within the screen of the first external device, and
transmit the coordinate information of the user input and information on a type of the user input to the first external device.

7. The electronic device of claim 1, wherein the at least one processor is further configured to replace a first screen with a second screen in a state of displaying the first screen of the first external device, based on reception of screen information on the second screen different from the first screen from the first external device.

8. The electronic device of claim 1, wherein the at least one processor is further configured to:
display a second VR content related to a second external device connected through the communication module,
identify, based on identification of at least one second marker image included in the second VR content, a second area for mirroring a screen of the second external device, and
display the screen of the second external device on the second area.

9. The electronic device of claim 1, wherein the VR content is disposed on a body portion of a virtual person corresponding to the account and determined to be displayed based on a behavior of the virtual person.

10. A server comprising:
a communication module;
a memory; and
at least one processor operatively connected to the communication module and the memory,
wherein the at least one processor is configured to:
acquire, based on receiving an account registration request for a virtual reality (VR) application from an external device through the communication module, external shape information corresponding to the external device from among a plurality of pieces of external shape information of electronic devices stored in the memory,
generate a marker image based on the account of which registration is requested and external shape information of the external device, and
transmit an execution screen of the VR application including the marker image to a wearable electronic device connected through the communication module.

11. A method of controlling an electronic device, the method comprising:
executing a virtual reality (VR) application;
identifying, based on displaying of a VR content related to a first external device connected through a communication module while the VR application is executing, at least one marker image included in the VR content;
identifying, based on matching of account information included in the at least one marker image and account information of the VR application, an area for mirroring a screen of the first external device based on the at least one marker image; and
displaying a screen of the first external device on the area.

12. The method of claim 11,
wherein the first external device is registered to a server in association with an account of the VR application through the first external device, and
wherein the VR content is generated from the server based on an external shape of the first external device and displayed on an execution screen of the VR application provided by the server.

13. The method of claim 12, wherein the marker image is generated from the server in association with the first external device and the account, based on registration of the first external device to the server and included in an execution screen of the VR application provided by the server.

14. The method of claim 11, wherein the displaying of the screen of the first external device on the area comprises:
displaying, based on matching of the account information of the VR application and account information included in a marker image among a plurality of marker images included in an execution screen of the VR application, a screen of the first external device by replacing the marker image; and displaying, based on non-matching of the account information of the VR application and account information included in the marker image among the plurality of marker images, the marker image.

15. The method of claim 11, further comprising:
transmitting, based on a user input received on a screen of the first external device displayed on the area, control information for controlling the first external device to the first external device.

16. The method of claim 15, wherein the transmitting of the control information for controlling the first external device to the first external device comprises:
acquiring, based on coordinate information of the area on which a screen of the first external device is displayed, coordinate information of the user input related to a location of the user input within the screen of the first external device; and
transmitting the coordinate information of the user input and information on a type of the user input to the first external device.

17. The method of claim 11, further comprising:
replacing a first screen with a second screen in a state of displaying the first screen of the first external device, based on reception of screen information on the second screen different from the first screen from the first external device.

18. The method of claim 11, further comprising:
Displaying a second VR content related to a second external device connected through the communication module;
identifying, based on identification of at least one second marker image included in the second VR content, a second area for mirroring a screen of the second external device; and
displaying a screen of the second external device on the second area.

19. The method of claim 11, wherein the VR content is disposed on a body portion of a virtual person corresponding to the account and determined to be displayed based on a behavior of the virtual person.

20. At least one non-transitory computer-readable recording medium storing at least one program including instructions, which when executed, instruct an electronic device to perform a method of:
executing a virtual reality (VR) application;
identifying, based on displaying of a VR content related to a first external device connected through a communication module while the VR application is executing, at least one marker image included in the VR content;
identifying, based on matching of account information included in the at least one marker image and account information of the VR application, an area for mirroring a screen of the first external device based on the at least one marker image; and
displaying a screen of the first external device on the area.

* * * * *